US006262833B1

(12) United States Patent
Loxley et al.

(10) Patent No.: US 6,262,833 B1
(45) Date of Patent: Jul. 17, 2001

(54) CAPSULES FOR ELECTROPHORETIC DISPLAYS AND METHODS FOR MAKING THE SAME

(75) Inventors: Andrew Loxley, Allston; Barrett Comiskey, Cambridge, both of MA (US)

(73) Assignee: E Ink Corporation, Cambridge, MA (US)

( * ) Notice: Subject to any disclaimer, the term of this patent is extended or adjusted under 35 U.S.C. 154(b) by 0 days.

(21) Appl. No.: 09/413,009

(22) Filed: Oct. 6, 1999

Related U.S. Application Data
(60) Provisional application No. 60/103,364, filed on Oct. 7, 1998.

(51) Int. Cl.[7] .............................. G02B 26/00; G09G 3/34
(52) U.S. Cl. ..................... 359/296; 204/606; 204/450; 345/107; 264/4
(58) Field of Search ....................... 359/296, 452; 204/606, 450, 456; 345/107, 108; 356/441; 264/4

(56) References Cited

U.S. PATENT DOCUMENTS

| 2,766,478 | 10/1956 | Raley, Jr. et al. . |
| 2,800,457 | 7/1957 | Green et al. . |
| 3,036,388 | 5/1962 | Tate . |
| 3,384,488 | 5/1968 | Tulagin et al. . |
| 3,389,194 | 6/1968 | Somerville . |
| 3,406,363 | 10/1968 | Tate . |
| 3,423,489 | 1/1969 | Arens et al. . |
| 3,460,248 | 8/1969 | Tate . |
| 3,585,381 | 6/1971 | Hodson et al. . |
| 3,612,758 | 10/1971 | Evans et al. . |
| 3,668,106 | 6/1972 | Ota . |
| 3,670,323 | 6/1972 | Sobel et al. . |
| 3,756,693 | 9/1973 | Ota . |

(List continued on next page.)

FOREIGN PATENT DOCUMENTS

| 563 807 | 7/1975 | (CH) . |
| 195 00 694 A1 | 8/1996 | (DE) . |
| 0 186 710 A1 | 7/1986 | (EP) . |

(List continued on next page.)

OTHER PUBLICATIONS

Anders, K., "Monodisperse Droplet Streams and Their Application in Space", Proc. Symp. Fluid Dynam., 1986, pp. 119–125.

(List continued on next page.)

Primary Examiner—Loha Ben
(74) Attorney, Agent, or Firm—Testa, Hurwitz & Thibeault, LLP

(57) ABSTRACT

An encapsulated electrophoretic display is made of at least one display element. Each display element includes at least one capsule. The capsule contains at least two substantially immiscible fluids. The first fluid includes an additive, and the second fluid contains a plurality of particles.

24 Claims, 7 Drawing Sheets

U.S. PATENT DOCUMENTS

| | | |
|---|---|---|
| 3,767,392 | 10/1973 | Ota . |
| 3,772,013 | 11/1973 | Wells . |
| 3,792,308 | 2/1974 | Ota . |
| 3,806,893 | 4/1974 | Ohnishi et al. . |
| 3,850,627 | 11/1974 | Wells et al. . |
| 3,870,517 | 3/1975 | Ota et al. . |
| 3,892,568 | 7/1975 | Ota . |
| 3,909,116 | 9/1975 | Kohashi . |
| 3,922,255 | 11/1975 | Koestler et al. . |
| 4,001,140 | 1/1977 | Foris et al. . |
| 4,041,481 | 8/1977 | Sato . |
| 4,045,327 | 8/1977 | Noma et al. . |
| 4,062,009 | 12/1977 | Raverdy et al. . |
| 4,068,927 | 1/1978 | White . |
| 4,071,430 | 1/1978 | Liebert . |
| 4,087,376 | 5/1978 | Foris et al. . |
| 4,088,395 | 5/1978 | Giglia . |
| 4,093,534 | 6/1978 | Carter et al. . |
| 4,104,520 | 8/1978 | Lewis et al. . |
| 4,123,206 | 10/1978 | Dannelly . |
| 4,123,346 | 10/1978 | Ploix . |
| 4,126,528 | 11/1978 | Chiang . |
| 4,126,854 | 11/1978 | Sheridon . |
| 4,143,103 | 3/1979 | Sheridon . |
| 4,143,472 | 3/1979 | Murata et al. . |
| 4,147,932 | 4/1979 | Lewis . |
| 4,149,149 | 4/1979 | Miki et al. . |
| 4,166,800 | 9/1979 | Fong . |
| 4,196,437 | 4/1980 | Hertz . |
| 4,201,691 | 5/1980 | Asher et al. . |
| 4,203,106 | 5/1980 | Dalisa et al. . |
| 4,211,668 | 7/1980 | Tate . |
| 4,218,302 | 8/1980 | Dalisa et al. . |
| 4,231,641 | 11/1980 | Randin . |
| 4,261,653 | 4/1981 | Goodrich . |
| 4,272,596 | 6/1981 | Harbour et al. . |
| 4,273,672 | 6/1981 | Vassiliades . |
| 4,279,632 | 7/1981 | Frosch et al. . |
| 4,285,801 | 8/1981 | Chiang . |
| 4,287,337 | 9/1981 | Guglielmetti et al. . |
| 4,298,448 | 11/1981 | Müller et al. . |
| 4,303,433 | 12/1981 | Torobin . |
| 4,305,807 | 12/1981 | Somlyody . |
| 4,311,361 | 1/1982 | Somlyody . |
| 4,314,013 | 2/1982 | Chang . |
| 4,324,456 | 4/1982 | Dalissa . |
| 4,368,952 | 1/1983 | Murata et al. . |
| 4,390,403 | 6/1983 | Batchelder . |
| 4,418,346 | 11/1983 | Batchelder . |
| 4,419,383 | 12/1983 | Lee . |
| 4,422,082 | 12/1983 | Louzil . |
| 4,438,160 | 3/1984 | Ishikawa et al. . |
| 4,439,507 | 3/1984 | Pan et al. . |
| 4,444,961 | 4/1984 | Timm . |
| 4,450,440 | 5/1984 | White . |
| 4,502,934 | 3/1985 | Gazard et al. . |
| 4,522,472 | 6/1985 | Liebert et al. . |
| 4,538,156 | 8/1985 | Durkee et al. . |
| 4,543,306 | 9/1985 | Dubois et al. . |
| 4,605,284 | 8/1986 | Fergason . |
| 4,620,916 | 11/1986 | Zwemer et al. . |
| 4,623,706 | 11/1986 | Timm et al. . |
| 4,643,528 | 2/1987 | Bell, Jr. . |
| 4,648,956 | 3/1987 | Marshall et al. . |
| 4,655,897 | 4/1987 | DiSanto et al. . |
| 4,666,673 | 5/1987 | Timm . |
| 4,673,303 | 6/1987 | Sanaone et al. . |
| 4,707,080 | 11/1987 | Fergason . |
| 4,726,662 | 2/1988 | Cromack . |
| 4,732,830 | 3/1988 | DiSanto et al. . |
| 4,742,345 | 5/1988 | DiSanto et al. . |
| 4,746,917 | 5/1988 | DiSanto et al. . |
| 4,748,366 | 5/1988 | Taylor . |
| 4,772,102 | 9/1988 | Fergason et al. . |
| 4,824,208 | 4/1989 | Fergason et al. . |
| 4,832,458 | 5/1989 | Fergason et al. . |
| 4,833,464 | 5/1989 | DiSanto et al. . |
| 4,850,919 | 7/1989 | DiSanto et al. . |
| 4,888,140 | 12/1989 | Schlameus et al. . |
| 4,889,603 | 12/1989 | DiSanto et al. . |
| 4,891,245 | 1/1990 | Micale . |
| 4,909,959 | 3/1990 | Lemaire et al. . |
| 4,919,521 | 4/1990 | Tada et al. . |
| 4,931,019 | 6/1990 | Park . |
| 4,947,219 | 8/1990 | Boehm . |
| 4,960,351 | 10/1990 | Kendall, Jr. et al. . |
| 5,009,490 | 4/1991 | Kouno et al. . |
| 5,017,225 | 5/1991 | Nakanishi et al. . |
| 5,040,960 | 8/1991 | Shioya et al. . |
| 5,041,824 | 8/1991 | DiSanto et al. . |
| 5,053,763 | 10/1991 | DiSanto et al. . |
| 5,057,363 | 10/1991 | Nakanishi . |
| 5,059,694 | 10/1991 | Delabouglise et al. . |
| 5,066,105 | 11/1991 | Yoshimoto et al. . |
| 5,066,559 | 11/1991 | Elmasry et al. . |
| 5,066,946 | 11/1991 | DiSantos et al. . |
| 5,070,326 | 12/1991 | Yoshimoto et al. . |
| 5,077,157 | 12/1991 | DiSanto et al. . |
| 5,082,351 | 1/1992 | Fergason . |
| 5,099,256 | 3/1992 | Anderson . |
| 5,105,185 | 4/1992 | Nakanowatari et al. . |
| 5,128,226 | 7/1992 | Hung . |
| 5,128,785 | 7/1992 | Yoshimoto et al. . |
| 5,132,049 | 7/1992 | Garreau et al. . |
| 5,138,472 | 8/1992 | Jones et al. . |
| 5,149,826 | 9/1992 | Delabouglise et al. . |
| 5,151,032 | 9/1992 | Igawa . |
| 5,174,882 | 12/1992 | DiSanto et al. . |
| 5,177,476 | 1/1993 | DiSanto et al. . |
| 5,185,226 | 2/1993 | Grosso et al. . |
| 5,187,609 | 2/1993 | DiSanto et al. . |
| 5,204,424 | 4/1993 | Roncali et al. . |
| 5,216,416 | 6/1993 | DiSanto et al. . |
| 5,216,530 | 6/1993 | Pearlman et al. . |
| 5,223,115 | 6/1993 | DiSanto et al. . |
| 5,223,823 | 6/1993 | DiSanto et al. . |
| 5,233,459 | 8/1993 | Bozler et al. . |
| 5,247,290 | 9/1993 | DiSanto et al. . |
| 5,250,932 | 10/1993 | Yoshimoto et al. . |
| 5,250,938 | 10/1993 | DiSanto et al. . |
| 5,254,981 | 10/1993 | DiSanto et al. . |
| 5,255,017 | 10/1993 | Lam . |
| 5,260,002 | 11/1993 | Wang . |
| 5,262,098 | 11/1993 | Crowley et al. . |
| 5,266,098 | 11/1993 | Chun et al. . |
| 5,266,937 | 11/1993 | DiSanto et al. . |
| 5,268,448 | 12/1993 | Buechner et al. . |
| 5,270,843 | 12/1993 | Wang . |
| 5,272,238 | 12/1993 | Garnier et al. ............... 528/9 |
| 5,276,113 | 1/1994 | Hashiguchi et al. . |
| 5,276,438 | 1/1994 | DiSanto et al. . |
| 5,279,511 | 1/1994 | DiSanto et al. . |
| 5,279,694 | 1/1994 | DiSanto et al. . |
| 5,293,528 | 3/1994 | DiSanto et al. . |
| 5,296,974 | 3/1994 | Tada et al. . |
| 5,298,833 | 3/1994 | Hou . |
| 5,302,235 | 4/1994 | DiSanto et al. . |
| 5,303,073 | 4/1994 | Shirota et al. . |
| 5,304,439 | 4/1994 | DiSanto et al. . |
| 5,315,312 | 5/1994 | DiSanto et al. . |
| 5,326,484 | 7/1994 | Nakashima et al. . |

| Patent No. | Date | Inventor | Class |
|---|---|---|---|
| 5,344,594 | 9/1994 | Sheridon . | |
| 5,359,346 | 10/1994 | DiSanto et al. . | |
| 5,360,689 | 11/1994 | Hou et al. . | |
| 5,372,852 | 12/1994 | Titterington et al. . | |
| 5,380,362 | 1/1995 | Schubert . | |
| 5,383,008 | 1/1995 | Sheridon . | |
| 5,389,945 | 2/1995 | Sheridon . | |
| 5,389,958 | 2/1995 | Bui et al. . | |
| 5,402,145 | 3/1995 | DiSanto et al. . | |
| 5,403,518 | 4/1995 | Schubert . | |
| 5,411,398 | 5/1995 | Nakanishi et al. . | |
| 5,411,656 | 5/1995 | Schubert . | |
| 5,421,926 | 6/1995 | Yukinobu et al. . | |
| 5,463,492 | 10/1995 | Check . | |
| 5,467,107 | 11/1995 | DiSanto et al. . | |
| 5,471,233 | 11/1995 | Okamoto et al. . | |
| 5,498,674 | 3/1996 | Hou et al. . | |
| 5,502,476 | 3/1996 | Neal et al. . | |
| 5,508,068 | 4/1996 | Nakano . | |
| 5,512,162 | 4/1996 | Sachs et al. . | |
| 5,528,399 | 6/1996 | Izumi et al. . | |
| 5,543,177 | 8/1996 | Morrison et al. . | |
| 5,543,219 | 8/1996 | Elwakil . | |
| 5,552,679 | 9/1996 | Murasko . | |
| 5,556,583 | 9/1996 | Tashiro . | |
| 5,561,443 | 10/1996 | DiSanto et al. . | |
| 5,565,885 | 10/1996 | Tamanoi . | |
| 5,573,711 | 11/1996 | Hou et al. | 252/572 |
| 5,582,700 | 12/1996 | Bryning et al. | 204/450 |
| 5,583,675 | 12/1996 | Yamada et al. | 349/84 |
| 5,597,889 | 1/1997 | Takimoto et al. | 528/353 |
| 5,604,027 | 2/1997 | Sheridon | 428/323 |
| 5,604,070 | 2/1997 | Rao et al. | 430/110 |
| 5,610,455 | 3/1997 | Allen et al. | 307/400 |
| 5,614,340 | 3/1997 | Bugner et al. | 430/31 |
| 5,627,561 | 5/1997 | Laspina et al. | 345/107 |
| 5,635,317 | 6/1997 | Taniguchi et al. | 430/7 |
| 5,638,103 | 6/1997 | Obata et al. | 347/164 |
| 5,639,914 | 6/1997 | Tomiyama et al. | 564/309 |
| 5,643,506 | 7/1997 | Rourke | 264/4.1 |
| 5,643,673 | 7/1997 | Hou | 428/402.24 |
| 5,650,199 | 7/1997 | Chang et al. | 427/33 |
| 5,650,247 | 7/1997 | Taniguchi et al. | 430/1 |
| 5,650,872 | 7/1997 | Saxe et al. | 359/296 |
| 5,654,367 | 8/1997 | Takimoto et al. | 525/178 |
| 5,663,224 | 9/1997 | Emmons et al. | 524/188 |
| 5,672,381 | 9/1997 | Rajan | 427/198 |
| 5,673,148 | 9/1997 | Morris et al. | 359/536 |
| 5,676,884 | 10/1997 | Tiers et al. | 252/582 |
| 5,688,584 | 11/1997 | Casson et al. | 428/209 |
| 5,691,098 | 11/1997 | Busman et al. | 430/158 |
| 5,693,442 | 12/1997 | Weiss et al. | 430/66 |
| 5,694,224 | 12/1997 | Tai | 358/455 |
| 5,707,738 | 1/1998 | Hou | 428/402 |
| 5,707,747 | 1/1998 | Tomiyama et al. | 428/457 |
| 5,708,525 | 1/1998 | Sheridon | 359/296 |
| 5,709,976 | 1/1998 | Malhotra | 430/124 |
| 5,714,270 | 2/1998 | Malhotra et al. | 428/537.5 |
| 5,715,511 | 2/1998 | Aslam et al. | 399/320 |
| 5,716,550 | 2/1998 | Gardner et al. | 252/500 |
| 5,717,283 | 2/1998 | Biegelsen et al. | 313/483 |
| 5,717,514 | 2/1998 | Sheridon | 359/296 |
| 5,717,515 | 2/1998 | Sheridon | 359/296 |
| 5,725,935 | 3/1998 | Rajan | 428/195 |
| 5,729,632 | 3/1998 | Tai | 382/237 |
| 5,737,115 | 4/1998 | Mackinlay et al. | 359/296 |
| 5,739,801 | 4/1998 | Sheridon | 345/84 |
| 5,745,094 | 4/1998 | Gordon, II et al. | 345/107 |
| 5,751,268 | 5/1998 | Sheridon | 345/107 |
| 5,753,763 | 5/1998 | Rao et al. | 525/276 |
| 5,754,332 | 5/1998 | Crowley | 359/296 |
| 5,759,671 | 6/1998 | Tanaka et al. | 428/166 |
| 5,760,761 | 6/1998 | Sheridon | 345/107 |
| 5,767,826 | 6/1998 | Sheridon et al. | 345/84 |
| 5,777,782 | 7/1998 | Sheridon | 359/296 |
| 5,783,614 | 7/1998 | Chen et al. | 523/205 |
| 5,808,783 | 9/1998 | Crowley | 359/296 |
| 5,825,529 | 10/1998 | Crowley | 359/296 |
| 5,828,432 | 10/1998 | Shashidhar et al. | 349/139 |
| 5,843,259 | 12/1998 | Narang et al. | 156/151 |
| 5,894,367 | 4/1999 | Sheridon | 359/623 |
| 5,900,858 | 5/1999 | Richley | 345/107 |
| 5,914,806 | 6/1999 | Gordon, II et al. | 359/296 |
| 5,930,026 | 7/1999 | Jacobson et al. | 359/296 |
| 5,961,804 | 10/1999 | Jacobson et al. | 204/606 |
| 6,005,791 | 12/1999 | Gudesen et al. | 365/114 |
| 6,005,817 | 12/1999 | Gudesen et al. | 365/215 |
| 6,014,247 | 1/2000 | Winter et al. | 359/296 |
| 6,045,955 | 4/2000 | Vincent | 430/45 |
| 6,064,784 | 5/2000 | Whitehead et al. | 385/18 |
| 6,067,185 | * 5/2000 | Albert et al. | 359/296 |
| 6,113,810 | 9/2000 | Hou et al. | 252/572 |
| 6,117,294 | 9/2000 | Rasmussen | 204/485 |
| 6,117,368 | 9/2000 | Hou | 252/572 |
| 6,118,426 | * 9/2000 | Albert et al. | 345/107 |
| 6,130,774 | * 10/2000 | Albert et al. | 359/296 |
| 6,177,921 | * 1/2001 | Comiskey et al. | 345/107 |

FOREIGN PATENT DOCUMENTS

| | | |
|---|---|---|
| 0 323 656 B1 | 7/1987 | (EP) . |
| 0 240 063 B1 | 10/1987 | (EP) . |
| 0 268 877 A2 | 6/1988 | (EP) . |
| 0 268 877 A3 | 6/1988 | (EP) . |
| 0 281 204 A2 | 9/1988 | (EP) . |
| 0 325 013 A1 | 7/1989 | (EP) . |
| 0 325 013 B1 | 7/1989 | (EP) . |
| 0 361 420 A2 | 4/1990 | (EP) . |
| 0 375 005 B1 | 6/1990 | (EP) . |
| 0 396 937 A2 | 11/1990 | (EP) . |
| 0 404 545 A2 | 12/1990 | (EP) . |
| 0 408 105 B1 | 1/1991 | (EP) . |
| 0 442 123 A1 | 8/1991 | (EP) . |
| 0 443 571 A2 | 8/1991 | (EP) . |
| 0 525 852 A1 | 2/1993 | (EP) . |
| 0 525 852 B1 | 2/1993 | (EP) . |
| 0 540 281 A2 | 5/1993 | (EP) . |
| 0 600 878 B1 | 6/1994 | (EP) . |
| 0 685 101 B1 | 12/1994 | (EP) . |
| 0 708 798 B1 | 5/1996 | (EP) . |
| 0 709 713 | 5/1996 | (EP) . |
| 0 721 176 A2 | 7/1996 | (EP) . |
| 0 721 176 A3 | 7/1996 | (EP) . |
| 0 778 083 A1 | 6/1997 | (EP) . |
| 0 962 808 A2 | 12/1999 | (EP) . |
| 1 024 540 A2 | 8/2000 | (EP) . |
| 1 314 906 | 4/1973 | (GB) . |
| 1 465 701 | 3/1977 | (GB) . |
| 2 044 508 | 10/1980 | (GB) . |
| 2 292 119 | 2/1996 | (GB) . |
| 2 306 229 | 4/1997 | (GB) . |
| 2 324 273 | 10/1998 | (GB) . |
| 53-73098 | 6/1978 | (JP) . |
| 54-111368 | 8/1979 | (JP) . |
| 55-096922 | 7/1980 | (JP) . |
| 59-098227 | 6/1984 | (JP) . |
| 60-189731 | 9/1985 | (JP) . |
| 60-197565 | 10/1985 | (JP) . |
| 62-058222 | 3/1987 | (JP) . |
| 62-231930 | 10/1987 | (JP) . |
| 62-269124 | 11/1987 | (JP) . |
| 62-299824 | 12/1987 | (JP) . |
| 01086116 | 3/1989 | (JP) . |

| | | | | | |
|---|---|---|---|---|---|
| 01086117 | 3/1989 | (JP) . | WO 99/65012 | 12/1999 | (WO) . |
| 01086118A | 3/1989 | (JP) . | WO 00/10048 | 2/2000 | (WO) . |
| 64-86116 | 3/1989 | (JP) . | WO 00/49593 | 8/2000 | (WO) . |
| 01142537 | 6/1989 | (JP) . | WO 00/54101 | 9/2000 | (WO) . |
| 01177517 | 7/1989 | (JP) . | | | |
| 01248182 | 10/1989 | (JP) . | | | |
| 01267525 | 10/1989 | (JP) . | | | |
| 02223934 | 9/1990 | (JP) . | | | |
| 02223935 | 9/1990 | (JP) . | | | |
| 02223936 | 9/1990 | (JP) . | | | |
| 02284124 | 11/1990 | (JP) . | | | |
| 02284125 | 11/1990 | (JP) . | | | |
| 3053224 | 3/1991 | (JP) . | | | |
| 3091772 | 4/1991 | (JP) . | | | |
| 3096925 | 4/1991 | (JP) . | | | |
| 04307512A | 10/1992 | (JP) . | | | |
| 4307523 | 10/1992 | (JP) . | | | |
| 04345133A | 12/1992 | (JP) . | | | |
| 5-61421 | 3/1993 | (JP) . | | | |
| 05165064 | 6/1993 | (JP) . | | | |
| 05173194 | 7/1993 | (JP) . | | | |
| 05307197 | 11/1993 | (JP) . | | | |
| 6089081 | 3/1994 | (JP) . | | | |
| 6-202168 | 7/1994 | (JP) . | | | |
| 07036020 | 2/1995 | (JP) . | | | |
| 2551783 | 8/1996 | (JP) . | | | |
| 08234176 | 9/1996 | (JP) . | | | |
| 9-6277 | 1/1997 | (JP) . | | | |
| 9031453A | 2/1997 | (JP) . | | | |
| 9-185087 | 7/1997 | (JP) . | | | |
| 9-211499 | 8/1997 | (JP) . | | | |
| 09230391 | 9/1997 | (JP) . | | | |
| 10-48673 | 2/1998 | (JP) . | | | |
| 10072571A | 3/1998 | (JP) . | | | |
| 10-149118 | 6/1998 | (JP) . | | | |
| 10-149118A | 6/1998 | (JP) . | | | |
| 10-161161 | 6/1998 | (JP) . | | | |
| 11212499 | 8/1999 | (JP) . | | | |
| 11219135 | 8/1999 | (JP) . | | | |
| 11237851 | 8/1999 | (JP) . | | | |
| 11352526 | 12/1999 | (JP) . | | | |
| WO 82/02961 | 9/1982 | (WO) . | | | |
| WO 92/17873 | 10/1992 | (WO) . | | | |
| WO 93/07000 | 4/1993 | (WO) . | | | |
| WO 94/24236 | 10/1994 | (WO) . | | | |
| WO 95/02636 | 1/1995 | (WO) . | | | |
| WO 95/05622 | 2/1995 | (WO) . | | | |
| WO 95/15363 | 6/1995 | (WO) . | | | |
| WO 95/19227 | 7/1995 | (WO) . | | | |
| WO 95/27924 | 10/1995 | (WO) . | | | |
| WO 95/33085 | 12/1995 | (WO) . | | | |
| WO 97/01165 | 1/1997 | (WO) . | | | |
| WO 97/01166 | 1/1997 | (WO) . | | | |
| WO 97/04398 | 2/1997 | (WO) . | | | |
| WO 97/24907 | 7/1997 | (WO) . | | | |
| WO 98/03896 | 1/1998 | (WO) . | | | |
| WO 98/19208 | 5/1998 | (WO) . | | | |
| WO 98/41898 | 9/1998 | (WO) . | | | |
| WO 98/41899 | 9/1998 | (WO) . | | | |
| WO 98/58383 | 12/1998 | (WO) . | | | |
| WO 99/03626 | 1/1999 | (WO) . | | | |
| WO 99/10767 | 3/1999 | (WO) . | | | |
| WO 99/10768 | 3/1999 | (WO) . | | | |
| WO 99/10769 | 3/1999 | (WO) . | | | |
| WO 99/12170 | 3/1999 | (WO) . | | | |
| WO 99/24715 | 5/1999 | (WO) . | | | |
| WO 99/26419 | 5/1999 | (WO) . | | | |
| WO 99/47970 | 9/1999 | (WO) . | | | |
| WO 99/53371 | 10/1999 | (WO) . | | | |
| WO 99/56171 | 11/1999 | (WO) . | | | |
| WO 99/65011 | 12/1999 | (WO) . | | | |

OTHER PUBLICATIONS

Berglund et al., "Generation of Monodisperse Aerosol Standards", *Environmental Science & Technology*, vol. 7, No. 1, Jan. 1973, pp. 147–153.

Bruce, C.A., "Dependence of Ink Jet Dynamics on Fluid Characteristics", *IBM J. Res. Develop.*, Dec. 5, 1975, pp. 258–270.

Dabora, E.K., "Production of Monodisperse Sprays", *The Review of Scientific Instruments*, vol. 38, No. 4, Apr. 1967, pp. 502–506.

Duthaler, GM, "Design of a Drop–On–Demand Delivery System for Molten Solder Microdrops", Submitted to the Dept. of Mech. Eng. at MIT, Jan. 1995, pp. 1–73.

Esen, "Synthesis of Spherical Microcapsules by Photopolymerization in Aerosols", *Colloid & Polymer Science*, vol. 275, No. 2, 1997, pp. 131–137.

Franjinone et al., "The Art and Science of Microencapsulation", *Technology Today*, 1995, no page numbers.

Ganan–Calvo, "Generation of Steady Microthreads and Micron–Sized Monodisperse Sprays in Gas Streams", *The American Physical Society*, vol. 80, No. 2, Jan. 12, 1998, pp. 285–288.

Lee, L., "A Magnetic–Particles Display", Proc. Soc. Inf. Disp. (USA), vol. 16, No. 3 (1975), pp. 177–184.

Lin et al., "Vibrating Orifice Droplet Generator for Precision Optical Studies", *Rev. Sci. Instrum*, vol. 61, No. 3, Mar. 1990, pp. 1018–1023.

Luckham, P.F. etc., "The Controlled Flocculation of Particulate Dispersion Using Small Particles of Opposite Charge. II. Investigation of Floc Structure Using a Freeze–Fracture Technique", Colloids and Surfaces, 6 (1983), pp. 83–95.

Luckham, P.F. etc., "The Controlled Flocculation of Particulate Dispersion Using Small Particles of Opposite Charge. III. Investigation of Floc Structure Using a Freeze–Fracture Technique", Colloids and Surfaces, 6 (1983), pp. 101–118.

Mansson, A., "Investigation of Electrically Charged Liquid Jets", *Physica Scripta* 4, Nov. 11, 1971, pp. 221–226.

Matsumoto et al., "A Production Process for Uniform–Size Polymer Particles", *Journal of Chemical Engineering of Japan*, vol. 22, No. 6, 1989, pp. 691–694.

Matsumoto et al., "Design Criteria of Hollow Cone Nozzle and Predicition of Drop Size Distribution", Proc. Of $1^{st}$ International Conference of Liquid Atomization and Spray Systems, 1978, pp. 79–84.

Matsumoto et al., "Production of Monodispersed Capsules", *J. Microencapsulation*, vol. 3, No. 1, 1986, pp. 25–31.

McCarthy et al., "Review of Stability of Liquid Jets and Influence of Nozzle Design", *The Chemical Engineering Journal*, vol. 7, 1974, pp. 1–20.

Nakabu, S et al, "The Development of Super–High Aperture Ratio with Low Electrically Resistive Material for High–Resolution TFT–LCDs", SID 99 Digest, pp. 732–735.

Orme et al., "Droplet Patterns from Capillary Stream Breakup", *Phys. Fluids*, vol. 5, No. 1, Jan. 1993, pp. 80–90.

Orme et al., "New Technique for Producing Highly Uniform Droplet Streams Over an Extended Range of Disturbance Wavenumbers", *Rev. Sci. Instrum.*, vol. 58, 1987, pp. 279–284.

Orme et al., "The Maipulation of Capillary Stream Breakup Using Amplitude Modulated Distrubances: A Pictorial and Quantitative Representation", Phys. Fluids, vol. 2, No. 7, Jul. 1990, pp. 1124–1140.

Park et al., "A Device for Producing Controlled Collisions Between Pairs of Drops", Chemical Engineering Science, vol. 20, pp. 39–45.

Reyleigh, "On the Instability of Jets", Proc. London Math Soc., vol. 10, 1879, pp. 4–13.

Ridley et al, "All–Inorganic Field effect Transistors Fabricated by Printing", Science, Oct. 22, 1999, vol. 286, pp. 746–748.

Scheller et al., "Viscous Jet Breakup: Nonsinusoidal Disturbances", Chem. Eng. Comm., vol. 107, 1991, pp. 35–53.

Schummer et al., "Production of Monodispersed Drops by Forced Disturbance of a Free Jet", Ger. Chem. Eng., vol. 5, 1982, pp. 209–220.

Shimoda et al., "Multicolor Pixel Patterning of Light–Emitting Polymers by Ink–Jet Printing", SID 99 Digest, May 1999, pp. 377–379.

Slocum, AH, "Kinematic Coupling Design", Precision Machine Design, Prentice Hall 1992, pp. 401–412.

Soule, C.A., "E Ink Pens Deal with Lucent", Mass. High Technology, Jul. 10, 2000, pp. 1, 18.

Tjahjadi et al., "Satellite and Subsatellite Formation in Capillary Breakup", The Journal of Fluid Mechanics, vol. 243, 1992, pp. 297–317.

Vincent, B. etc., "Adsorption of Small, Positive Particles onto Large, Negative Particles in the Presence of Polymer", J.C.S. Faraday 1, 1980, 76, pp. 665–673.

White, F.M., Excerpts from Fluid Mechanics, 1997, pp. 351–356.

Nakamura et al., "Development of Electrophoretic Display Using Microencapsulated Suspension," 1998 ISD International Symposium Digest of Technical Papers, vol. 29, Proceedings of SID '98 International Symposium, May 1998, (pp. 1014–1017).

Drzaic et al., "44.3L: A Printed and Rollable Bistable Electronic Display," SID 98 Digest, 1998, (pp. 1131–1134).

Brenn et al., "Monodisperse Sprays for Various Purposes— Their Production and Characteristics," Part. Part. Syst. Charact. 13, 1996, (pp. 179–185).

Brenn et al., "A New Apparatus for the Production of Monodisperse Sprays at High Flow Rates," Chemical Engineering Science, 1997, vol. 52, No. 2, (pp. 237–244).

Matsumoto et al. (1982) "Generation of Monodispersed Concentric Two Phase Droplets for Encapsulation," ICLASS–'82, Reports & Proc, 2nd Int. Conf. on Liquid Atomization & Spray Systems, Paper 2–4:63–67.

Heinzl and Hertz (1985), "Ink Jet Printing," Advances in Electronics and Electron Physics, 65:91–171.

Ackerman, "E Ink of Cambridge Gets Start–Up Funding," Dec. 1997.

Ballinger, "Magnetic Recording Paper is Erasble," Electronics, Mar. 1973, (pp. 73–76).

Beilin et al., "8.5: 2000–Character Electrophoretic Display," SID 86 Digest, 1986, (pp. 136–140).

Blazo, "10.1/9:00 A.M.: High Resolution Electrophoretic Display with Photoconductor Addressing," SID 82 Digest, 1982, (pp. 92–93).

Bohnke et al., "Polymer–Based Solid Electrochronic Cell for Matrix–Addressable Display Devices," J. Electrochem Soc., Dec. 1991, vol. 138, No. 12, (pp. 3612–3617).

Bryce, "Seeing Through Synthetic Metals," Nature, Sep. 1988, vol. 335, No. 1, (pp. 12–13).

Chiang et al., "11.5/4:10 P.M.: A High Speed Electrophoretic Matrix Display," SID 80 Digest, 1980, (pp. 114–115).

Chiang et al. (1979), "7.5/4:05 P.M.: A Stylus Writable Electrophoretic Display Device," SID 79 Digest, pp. 44–45.

Chiang, "Conduction Mechanism of Charge Control Agents Used in Electrophoretic Display Devices," Proceeding of the S.I.D., 1977, vol. 18, Nos. 3 & 4, (pp. 275–282).

Comiskey et al., "7.4L: Late–News Paper: Electrophoretic Ink: A Printable Display Material," SID 97 Digest, 1997, (pp. 75–76).

Croucher et al., "Electrophoretic Display: Materials as Related to Performance," Photographic Science and Engineering, 1981, 25(2): 80–86.

Dalisa, "Electrophoretic Display Technology," Transactions on Electron Devices, Jul. 1977, vol. 24, No. 7, (pp. 827–834).

Egashira et al., "A Solid Electrochromic Cell Consisting of LU–Diphthalocyanine and Lead Fluoride," Proceedings of the SID, 1987, vol. 28, No. 3, (pp. 227–232).

Fitzhenry, "Optical Effects of Adsorption of Dyes on Pigment Used on Electrophoretic Image Displays," Applied Optics, Oct. 1979, vol. 18, No. 19, (pp. 3332–3337).

Fitzhenry, "Optical Properties of Electrophoretic Image Displays," Proceedings of the SID, 1981, vol. 22, No. 4, (pp. 300–309).

Gutcho, "Capsule Wall Treatment," Microcapsules and Microencapsulation Techniques, 1976, (pp. 156–177).

Gutcho, "Microencapsulation with Synthetic Polymeric Film Formers," Microcapsules and Microencapsulation Techniques, 1976, (pp. 65–130).

Gutcho, "Pigments and Paints," Microcapsules and Microencapsulation Techniques, 1976, (pp. 178–193).

"Electronic Book is a Whole Library," Sunday Times Newspaper, Feb. 1996.

"Electronic Ink Sign Debuts at JCPenney," Boston Globe, May 1999.

Comiskey et al., "An Electrophoretic Ink for All–Printed Reflective Electronic Displays," Nature, Jul. 1998, vol. 394, (pp. 253–255).

Flaherty, "What Did Disappearing Ink Grow Up to Be? Electronic Ink," The New York Times, May 1999.

Goodman, "Passive Liquid Displays: Liquid Crystals, Electrophoretics, and Electrochromics," Proceeding of the SID, 1976, vol. 17, No. 1, (pp. 30–38).

Gutcho, "Additional Uses for Encapsulated Products," Microencapsules and Microencapsulation Techniques, 1976, (pp. 278–343).

Hatano et al., "18.3: Bistable Paper–White Display Device Using Cholesteric Liquid Crystals," SID 96 Digest, 1996, (pp. 269–272).

Howe, "MIT Book Would Bind Computer "Ink" to Paper," Boston Globe, 1996, (pp. 31 & 35).

Ji et al., "P–50: Polymer Walls in Higher–Polymer–Content Bistable Reflective Cholesteric Displays," SID 96 Digest, (pp. 611–613).

Jin et al., "Optically Transparant, Electrically Conductive Composite Medium," Science, 1992, (pp. 446–448).

Lewis, "Gravitational, Inter–Particle and Particle–Electrode Forces in the Electrophoretic Display," Proceeding of the SID, 1977, vol. 18, Nos. 3 & 4 (pp. 235–242).

Microencapsulation: Processes and Applications, Jan. E. Vandegaer, ed., American Chemical Society Symposium, Chicago, IL, 1973, pp. v–x, 1–180 (published by Plenum Press, New York, 1974).

Mürau et al., "7.6/4:40 P.M.: An Electrophoretic Radiographic Device," *SID 79 Digest*, 1979, (pp. 46–47).

Mürau et al., "The Understanding and Elimination of Some Suspension Instabilities in a Electrophoretic Display," *J. Appl. Phys.*, Sep. 1978, vol. 49, No. 9 (pp. 4820–4829).

Platt, "Digital Ink," *Wired*, May 1997, (pp. 162, 165, 208–210).

Sankus, "Electrophoretic Display Cell," *Xerox Disclosure Journal*, May/Jun. 1979, vol. 4, No. 3, (p. 309).

Guernsey, "Beyond Neon: Electronic Ink," *New York Times*, Jun. 1999 (p. B11).

Lee (1977), "Fabrication of Magnetic Particles Display," Proceeding of the SID, 18(3,4):283–288.

Negroponte et al., "Surfaces and Displays," *Wired*, Jan. 1997, (p. 212).

Ota et al., "Developments in Electrophoretic Displays," Proceedings of the SID, 1977, 18(3 & 4):243–254.

Ota et al., "Electrophoretic Display Devices," Laser 75 Optoelectronics Conference Proceedings, 1975, (pp. 145–148).

Ota et al., "Electrophoretic Image Display," Proceedings of the IEEE, Jul. 1973, (pp. 832–836).

Pankove, "Color Reflection Types Display Panel," *RCA Technical Notes*, Mar. 1962, No. 535, (2 sheets).

Pansu et al. (1983), "Thin Colloidal Crystals: A Series of Structural Transitions," *J. Physique*, 44:531–536.

Pansu et al. (1984), "Structures of Thin Layers of Hard Spheres: High Pressure Limit," *J. Physique*, 45:331–339.

Pearlstein, "Electroless Plating," in *Modern Electroplating*, Lowenheim, ed., $3^{rd}$ Edition, John Wiley & Sons, Inc., New York, 1976, pp. 710–747.

Peiranski et al. (1983), "Thin Colloidal Crystals," *Physical Review Letters*, 50(12):900–903.

Peterson, "Rethinking Ink Printing the Pages of an Electronic Book," *Science News*, Jun. 1998, vol. 153, (pp. 396–397).

Saitoh et al., "A Newly Developed Electrical Twisting Ball Display," Proceedings of the SID, 1982 vol. 23, No. 4, (pp. 249–253).

Sheridon et al., "The Gryicon—A Twisting Ball Display," Proceeding of the SID, 1977, vol. 18, Nos. 3 & 4, (pp. 289–293).

Shiffman et al., "An Electrophoretic Display with Internal NMOS Address Logic and Display Drivers," Proceedings of the SID, 1984, vol. 25, No. 2, (pp. 105–115).

Vaz et al., "Dual Frequency Addressing of Polymer–Dispersed Liquid–Crystal Films," *J. Appl. Phys.*, Jun. 1989, vol. 65, No. 12, (pp. 5043–5050).

Shiwa et al., "5.6: Electrophoretic Display Method Using Ionographic Technology," *SID 88 Digest*, 1988, (pp. 61–62).

Singer et al., "An X–Y Addressable Electrophoretic Display," Proceeding of the SID, 1977, vol. 18, Nos. 3 & 4, (pp. 255–266).

Van Winkle et al. (1986) "Layering Transitions in Colloidal Crystals as Observed by Diffraction and Direct–Lattice Imaging", *Physical Review*, 34:562–573.

Vance, "Optical Characteristics of Electrophoretic Displays," Proceeding of the SID, 1977, vol. 18, Nos. 3 & 4, (pp. 267–274).

White, "An Electrophoretic Bar Graph Display," Proceedings of the SID, 1981, 22(3):173–180.

Yamaguchi et al., "Equivalent Circuit of Ion Projection–Driven Electrophoretic Display," *IEICE Transactions*, 1991, vol. 74, No. 12, (4152–4156).

Yang et al., "A New Architecture for Polymer Transistors," *Nature*, Nov. 1994, vol. 372, (pp. 344–346).

Zollinger, "Structure of Simple Di–and Triarylmethine Dyes," *Color Chemistry*, 1991, (pp. 71–75).

Anita, "Switchable Reflections Make Electronic Ink," *Science*, 1999, 256:658.

Zurer, "Digital Ink Brings Electronic Books Closer," *Chemical*, Jul. 1998, (pp. 12–13).

Dabbousi et al., "Electroluminescence from CdSe Quantum– dot/Polymer Composites," *Applied Physics Letters*, 1995, vol. 66, No. 11, (pp. 1316–1318).

Huang et al., "Photoluminescence and Electroluminescence of ZnS:Cu Nanocrystals in Polymeric Networks," *Applied Physics Letters*, 1997, vol. 70, No. 18, (pp. 2335–2337).

"E Ink debuts in J.C. Penney stores", *Boston Herald*, May 23, 1999, (p. 27).

* cited by examiner

CAPSULES FOR ELECTROPHORETIC DISPLAYS AND METHODS FOR MAKING THE SAME

CROSS-REFERENCE TO RELATED APPLICATIONS

This application claims priority to and the benefit of U.S. provisional patent application No. 60/103,364, filed Oct. 7, 1998, the entire disclosure of which is incorporated herein by reference.

TECHNICAL FIELD

The present invention relates to electrophoretic elements, particularly encapsulated electrophoretic elements, and to methods and materials useful in fabricating such elements.

BACKGROUND

Electrophoretic displays have been the subject of intense research and development for a number of years. Electrophoretic displays have attributes of good brightness and contrast, wide viewing angles, state bistability, and low power consumption when compared with liquid crystal displays. Nevertheless, problems with the long-term image quality of these displays have, to date, prevented their widespread usage.

The recent invention of encapsulated electrophoretic displays solves many of these problems and offers additional advantages compared to liquid crystal displays. Some added advantages are the ability to print or coat the display material on a wide variety of flexible and rigid substrates. Particle clustering and settling problems are reduced and service-life is increased.

The purpose of this disclosure is to describe electrophoretic elements and displays, especially encapsulated electrophoretic elements and displays, and classes of materials, as well as some specific materials, which are useful in their construction.

SUMMARY OF THE INVENTION

The present invention relates to capsules containing substantially immiscible liquids as the internal phase and methods for producing such capsules. Such capsules can be used, for example, in the fabrication of reflective, electrophoretic display devices. Throughout the Specification, the invention is described as a display for ease of description. However, the compositions and processes disclosed herein are equally applicable to "elements." A display is one example of the broader concept of an element. One or more elements can be ordered into a display or other articles of manufacture. Elements can include any of the features described for a display.

An electrophoretic display (EPID) can be formed by placing a capsule containing a dyed fluid and pigment particles between a pair of electrodes. The pigment particles move from one electrode to the other under the influence of an electric field situated between the electrodes. When viewing the device from the transparent (front) electrode, the display has a color of the pigment particles (for example, white titanium dioxide particles) when the polarity of that electrode is opposite to the charge on the particles. This state is referred to as the white state. When the electric field is reversed, the pigment particles migrate to the rear electrode, and the viewer sees only the color of the dyed liquid. This state is referred to as the dark state.

The presence of the dyed fluid in the spaces between the pigment particles degrades the appearance of the white state. For closely-packed, uniformly spherical particles, the space between particles accounts for 25% of the total volume occupied by the spheres, a significant amount. The present invention solves at least one problem associated with this generic type of display. Utilizing immiscible fluids, as more fully described below, allows the white state to be improved compared with the degraded white state of some other displays.

The successful construction of an encapsulated electrophoretic display requires the proper interaction of several different types of materials and processes. Materials such as a polymeric binder, a capsule membrane, and the electrophoretic particles and fluid must all be chemically compatible. The capsule membranes may engage in useful surface interactions with the electrophoretic particles, or may act as an inert physical boundary between the fluid and the binder. Polymer binders may set as adhesives between capsule membranes and electrode surfaces.

In some cases, a separate encapsulation step of the process is not necessary. The electrophoretic fluid may be directly dispersed or emulsified into the binder (or a precursor to the binder material) to form what may be called a "polymer-dispersed electrophoretic display." In such displays, the individual electrophoretic phases may be referred to as capsules or microcapsules even though no capsule membrane is present. Such polymer-dispersed electrophoretic displays are considered to be subsets of encapsulated electrophoretic displays.

In an encapsulated electrophoretic display, the binder material surrounds the capsules and separates the two bounding electrodes. This binder material may be compatible with the capsule and bounding electrodes and may possess properties that allow for facile printing or coating. It also may possess barrier properties for water, oxygen, ultraviolet light, the electrophoretic fluid, or other materials. Further, it may contain surfactants and cross-linking agents, which could aid in coating or durability. The polymer-dispersed electrophoretic display may be of the emulsion or phase separation type.

In one aspect, the present invention relates to an encapsulated electrophoretic display element that includes a capsule that contains at least two substantially immiscible fluids. A first fluid includes an additive and a second fluid includes a plurality of particles. This aspect can have any of the following features. The additive can include a dye and/or a second plurality of particles. The dye can be substantially soluble in the first fluid and/or insoluble in the second fluid. At least a portion of the second particles can be substantially non-dispersible in the second fluid, and/or at least a portion of the second particles can have a surface treatment. At least a portion of the particles of the second fluid can be substantially non-dispersible in the first fluid, and/or at least a portion of the plurality of particles can have a surface treatment. The first and second fluids, respectively, can be selected from pairs of fluids including ethanol/n- hexadecane, acetone/n-hexadecane, low molecular weight silicone polymers/alkanes, low molecular weight fluorinated polymers/alkanes, perfluoroheptane/n-dodecane, and perfluoroalkanes/hydrogenated alkanes. The second and first fluids, respectively, can be selected from pairs of fluids including ethanol/n-hexadecane, acetone/n-hexadecane, low molecular weight silicone polymers/alkanes, low molecular weight fluorinated polymers/alkanes, perfluoroheptane/n-dodecane, and perfluoroalkanes/hydrogenated alkanes. The particles of the second fluid and/or the second particles are capable of moving under an electric field. The first fluid is capable of being displaced by the particles of the second fluid, and/or the second fluid is capable of being placed by the second particles. The particles of the second fluid can include at least two different species of particles, the species of particles differing in their size and/or their shape.

Another aspect of the invention relates to a process for creating an encapsulated electrophoretic display. The process includes the steps of forming a first mixture that includes an additive in a first fluid; forming a second mixture that includes a plurality of particles in a second fluid; combining the first mixture and the second mixture into a droplet such that the first and second mixtures are substantially separate; and forming a capsule around the droplet. This aspect of the invention can have any of the features described above including having an additive that includes a dye and/or a second plurality of particles.

Another aspect of the invention relates to an encapsulated electrophoretic display that includes at least one display element described above. Any display element can include any of the features described above, including having an additive that includes a dye and/or a second plurality of particles. The display also can include at least one electrode adjacent the display element.

BRIEF DESCRIPTION OF THE DRAWINGS

The invention is more particularly described in the following detailed description, drawings, and claims. In the drawings, like reference characters generally refer to the same parts throughout the different views. Also, the drawings are not necessarily to scale, emphasis instead generally being placed upon illustrating principles of the invention.

DETAILED DESCRIPTION OF THE INVENTION

Figure 1:
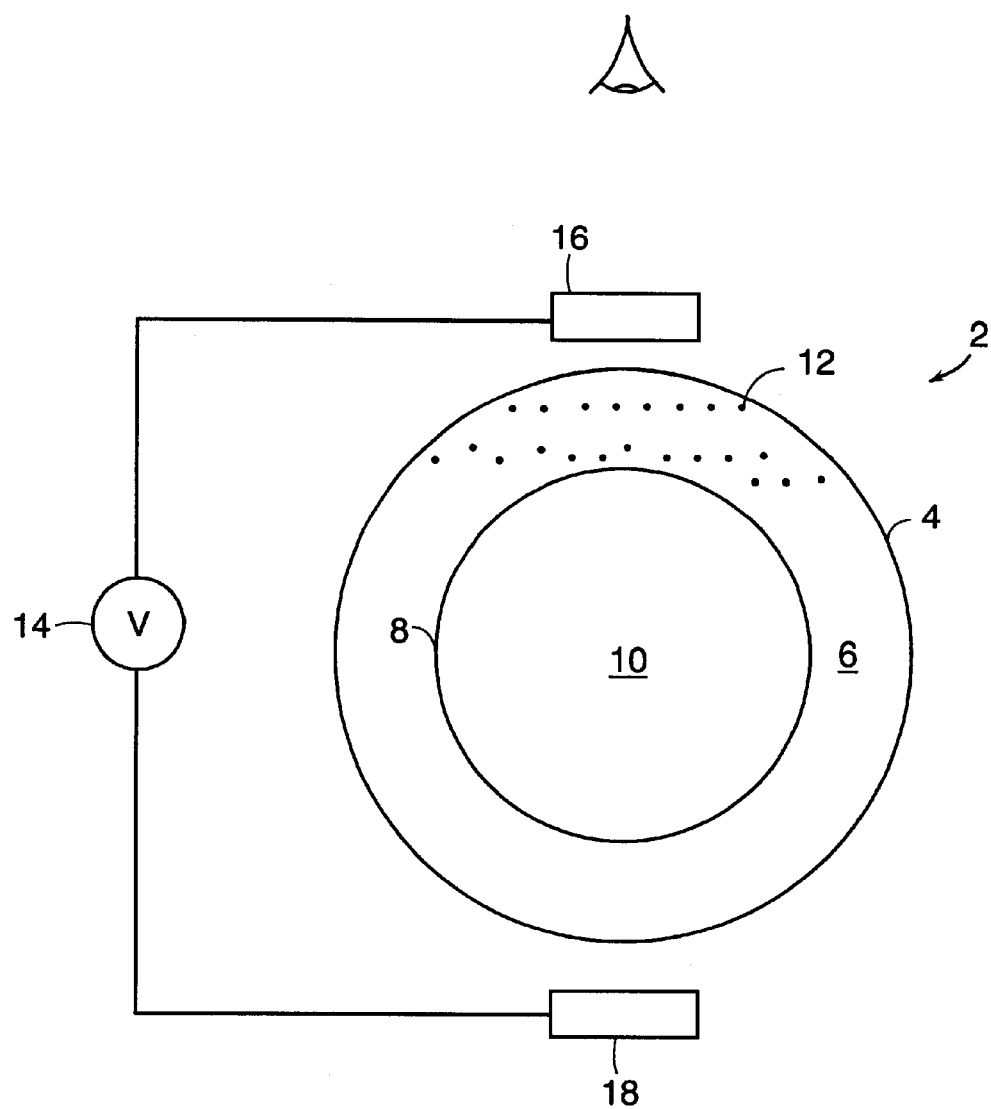
FIG. 1 is a schematic representation of a capsule of the invention addressed to a white state, the capsule containing a central subdroplet surrounded by another fluid.

This invention relates to improved encapsulated electrophoretic displays and materials and methods useful in their construction. Generally, an encapsulated electrophoretic display includes one or more species of particle that either absorb or scatter light. One example is a system in which the capsules contain one or more species of electrophoretically mobile particles dispersed in a dyed suspending fluid. Another example is a system in which the capsules contain two separate species of particles suspended in a clear suspending fluid, in which one species of particle absorbs light (dark), while the other species of particle scatters light (white). There are other extensions (more than two species of particles, with or without a dye, etc.). The particles are commonly solid pigments, dyed particles, or pigment/polymer composites.

Electrophoretic displays of the invention are described below. These displays are preferably microencapsulated electrophoretic displays. Also described below are materials that may be useful in such displays.

I. Electrophoretic Displays

An object of the invention is to provide a highly-flexible, reflective display which can be manufactured easily, consumes little (or no, in the case of bistable displays) power, and can, therefore, be incorporated into a variety of applications. The invention features a printable display comprising an encapsulated electrophoretic display medium. The resulting display is flexible. Since the display media can be printed, the display itself can be made inexpensively.

An encapsulated electrophoretic display can be constructed so that the optical state of the display is stable for some length of time. When the display has two states which are stable in this manner, the display is said to be bistable. If more than two states of the display are stable, then the display can be said to be multistable. For the purpose of this invention, the term bistable will be used to indicate a display in which any optical state remains fixed once the addressing voltage is removed. The definition of a bistable state depends on the application for the display. A slowly-decaying optical state can be effectively bistable if the optical state is substantially unchanged over the required viewing time. For example, in a display which is updated every few minutes, a display image which is stable for hours or days is effectively bistable for that application. In this invention, the term bistable also indicates a display with an optical state sufficiently long-lived as to be effectively bistable for the application in mind. Alternatively, it is possible to construct encapsulated electrophoretic displays in which the image decays quickly once the addressing voltage to the display is removed (i.e., the display is not bistable or multistable). In some applications it is advantageous to use an encapsulated electrophoretic display which is not bistable. Whether or not an encapsulated electrophoretic display is bistable, and its degree of bistability, can be controlled through appropriate chemical modification of the electrophoretic particles, the suspending fluid, the capsule, and binder materials.

An encapsulated electrophoretic display may take many forms. The display may comprise capsules dispersed in a binder. The capsules may be of any size or shape. The capsules may, for example, be spherical and may have diameters in the millimeter range or the micron range, but is preferably from ten to a few hundred microns. The capsules may be formed by an encapsulation technique, as described below. Particles may be encapsulated in the capsules. The particles may be two or more different types of particles. The particles may be colored, luminescent, light-absorbing or transparent, for example. The particles may include neat pigments, dyed (laked) pigments or pigment/polymer composites, for example. The display may further comprise a suspending fluid in which the particles are dispersed.

In electrophoretic displays, the particles may be oriented or translated by placing an electric field across the capsule. The electric field may include an alternating-current field or a direct-current field. The electric field may be provided by at least one pair of electrodes disposed adjacent to a display comprising the capsule.

Throughout the specification, reference will be made to printing or printed. As used throughout the specification, printing is intended to include all forms of printing and coating, including: premetered coatings such as patch die coating, slot or extrusion coating, slide or cascade coating, and curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; and other similar techniques. A "printed element" refers to an element formed using any one of the above techniques.

Referring to FIG. 1, a capsule 2 is shown in the white state. A fluid 10, located towards the center of the capsule 2, contains a dye. Particles 12 are contained in a second fluid 6 that is located inside a capsule wall 4, surrounding the dyed fluid 10. The second fluid 6 typically is a clear fluid. The two fluids are substantially immiscible. As such, a boundary 8 is formed between the outermost edge of the dyed fluid 10 and the second fluid 6. The particles 12 have a surface treatment, more fully described below. The dyed fluid 10, in this embodiment, is formed as a single subdroplet within the second fluid 6. The fluid 10 containing a dye can include a second plurality of particles in addition to, or in the place of, the dye.

When an electric field is applied to the capsule 2, the pigment particles 12, suspended in the second fluid 6, can migrate to the electrode of opposite polarity. The front electrode 16 is charged oppositely from the particles 12 in FIG. 1. The particles 12 are located at the front of the capsule 2, adjacent the front electrode 16, under the influence of an electric field generated by a voltage generator 14. In this state, the particles 12, for example, titanium dioxide particles, appear white to a viewer. The viewer sees a white state that is not tainted by dye between the particles 12 because the particles 12 only move through the clear fluid 6. The dyed fluid 10 is substantially unable to mix with the clear fluid 6. When the particles 12 encounter the boundary 8 between the two fluids 6, 10, the particle surface treatment prevents substantial penetration of the particles 12 into the dyed fluid 10. In this way, the particles 12 typically remain in the clear second fluid 6. Additionally, while the particles 12 move towards the electrode 16 of opposite charge, the dyed droplet 10 can be displaced towards an opposite (rear) electrode 18.

Figure 2:
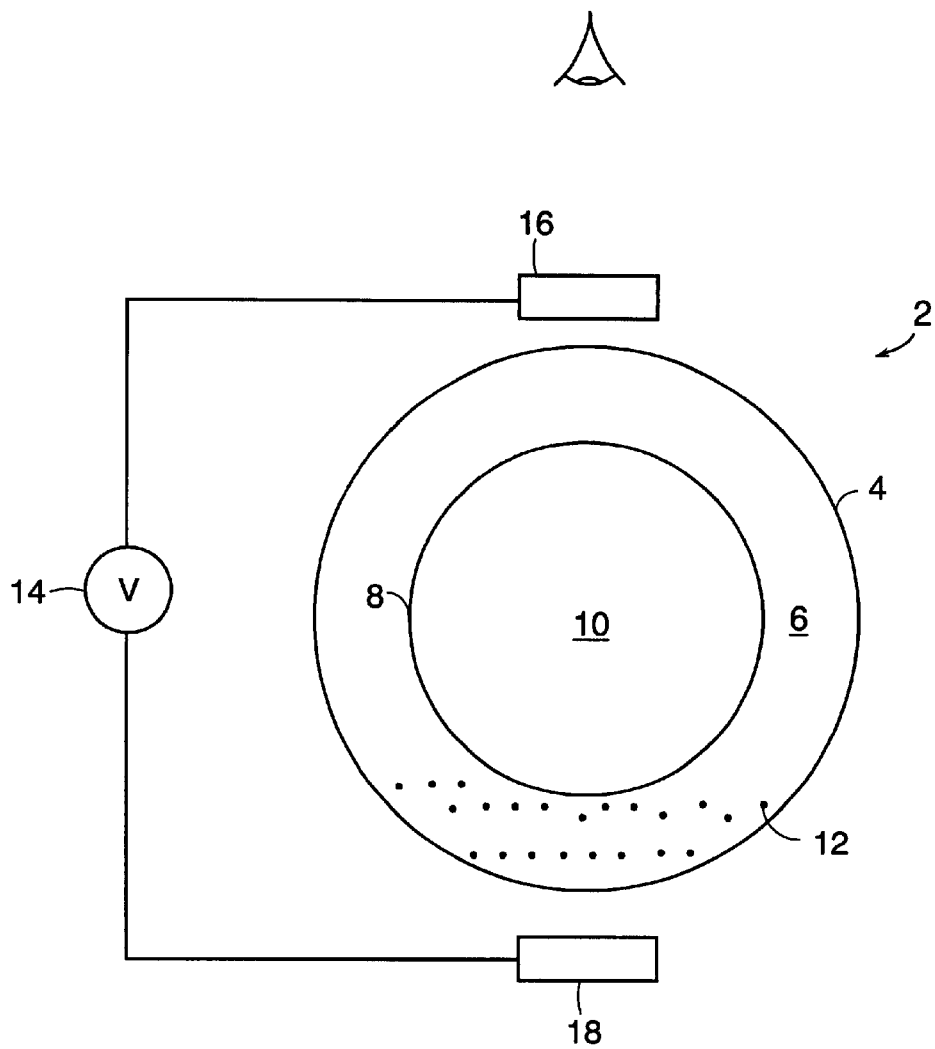
FIG. 2 is a schematic representation of a capsule of the invention addressed to a dark state, the capsule containing a central subdroplet surrounded by another fluid.

Now referring to FIG. 2, the capsule 2 is shown in the dark state. When the electric field is reversed, the particles 12, along with the fluid 6 in which they are suspended, move to the rear of the capsule 2, adjacent the rear electrode 18. This movement exposes the droplet of dyed fluid 10 to a viewer such that the viewer observes the capsule 2 in the dark state. In this state, the dyed fluid 10 hides the particles 12 from view, and the capsule 2 takes on the appearance of the dyed fluid 10, typically a colored dye. Other states besides white and dark are possible. For example, a capsule may have two or more states, each state characterized by a different colored appearance.

Figure 4:
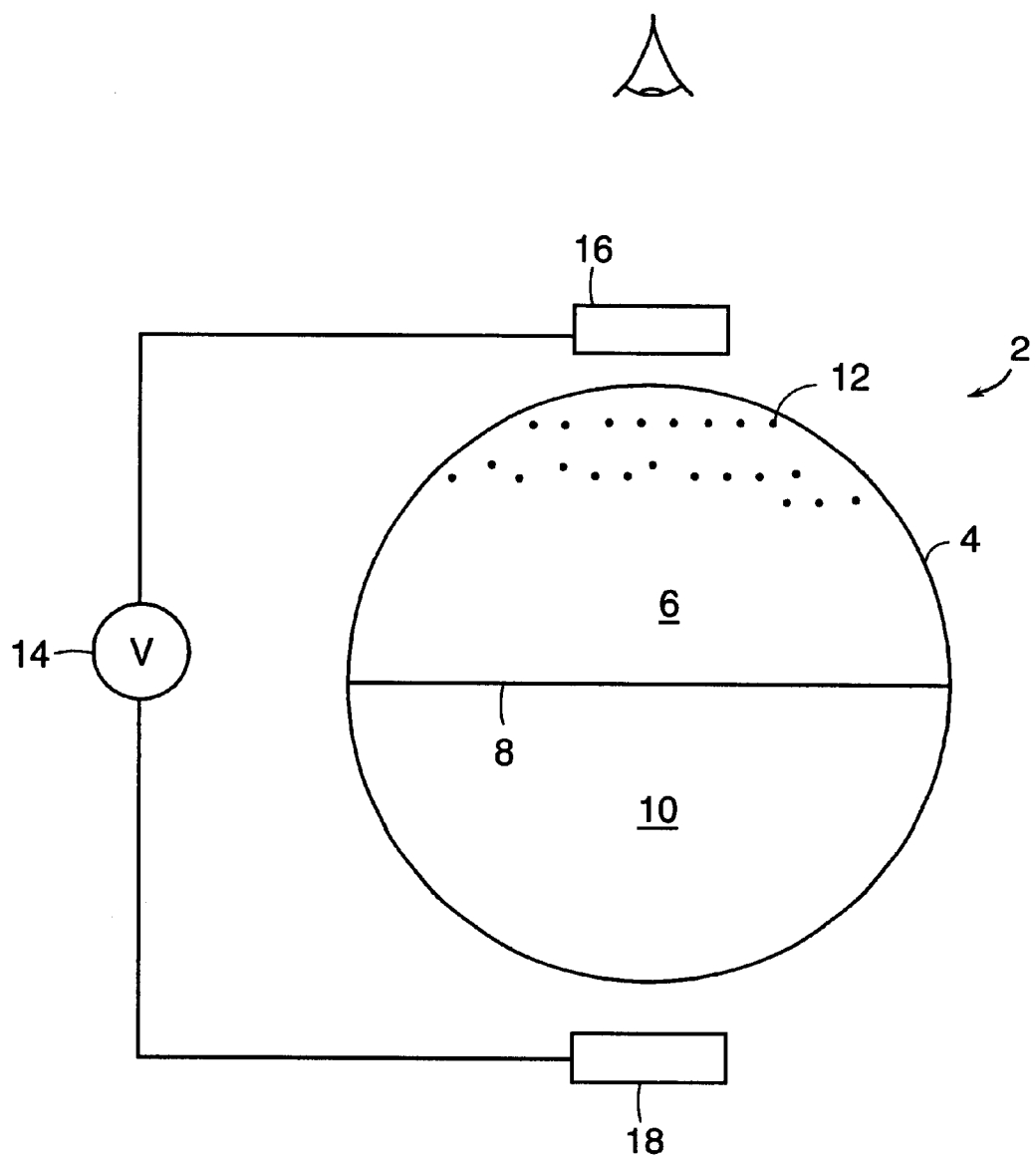
FIG. 4 is a schematic representation of a capsule of the invention addressed to a white state, the capsule containing a dyed subdroplet and a particle-containing subdroplet.
Figure 5:
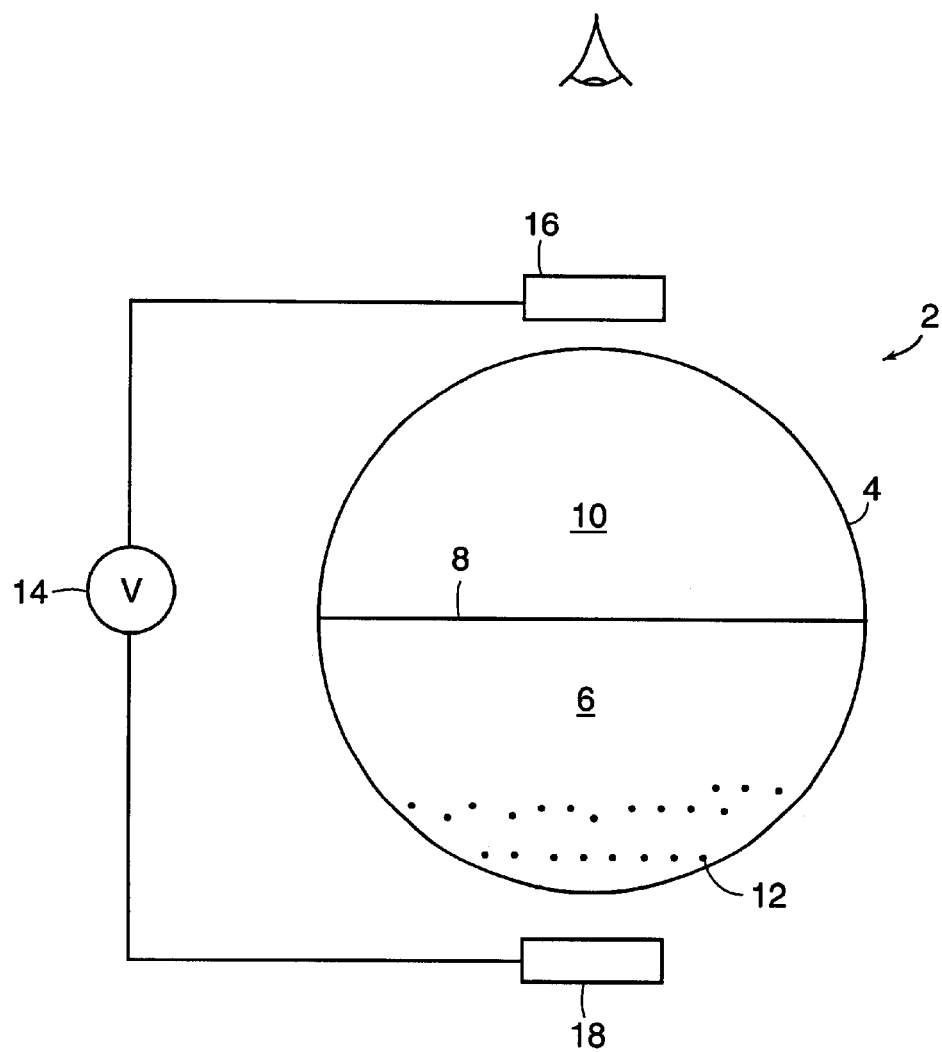
FIG. 5 is a schematic representation of a capsule of the invention addressed to a dark state, the capsule containing a dyed subdroplet and a particle-containing subdroplet.

Other configurations of the present invention also are useful. For example, but without limitation, the embodiments shown in FIGS. 4–7 are useful. A capsule 2 is shown in FIGS. 4 and 5 in which a boundary 8 separates a fluid 10 containing a dye from a fluid 6 containing particles 12. A capsule wall 4 surrounds both fluids 6, 10. In the white state, shown in FIG. 4, particles 12 are located near the front of the capsule 2. As described above, the particles 12 appear white to a viewer. The white is uncompromised because the particles 12 are suspended in a clear fluid 6. The dye in the other fluid 10 is separated from the clear fluid 6, and the particles 12 do not substantially penetrate the dyed fluid 10 due to a surface treatment on the particles 12. In the dark state, shown in FIG. 5, the electric field between two electrodes 16, 18, generated by the voltage generator 14, is reversed from the field used to produce (although not necessarily to maintain) the white state. Thus, the particles 12, in the clear fluid 6, move to the rear of the capsule, hiding the particles 12 from view and exposing the dyed fluid 10 to a viewer. The capsule 2 takes on the appearance of the color of the dye. The particles 12 and clear fluid 6 can move together to displace the other fluid 10, and the particles 12 and/or fluid can be influenced by the electric field.

Figure 6:
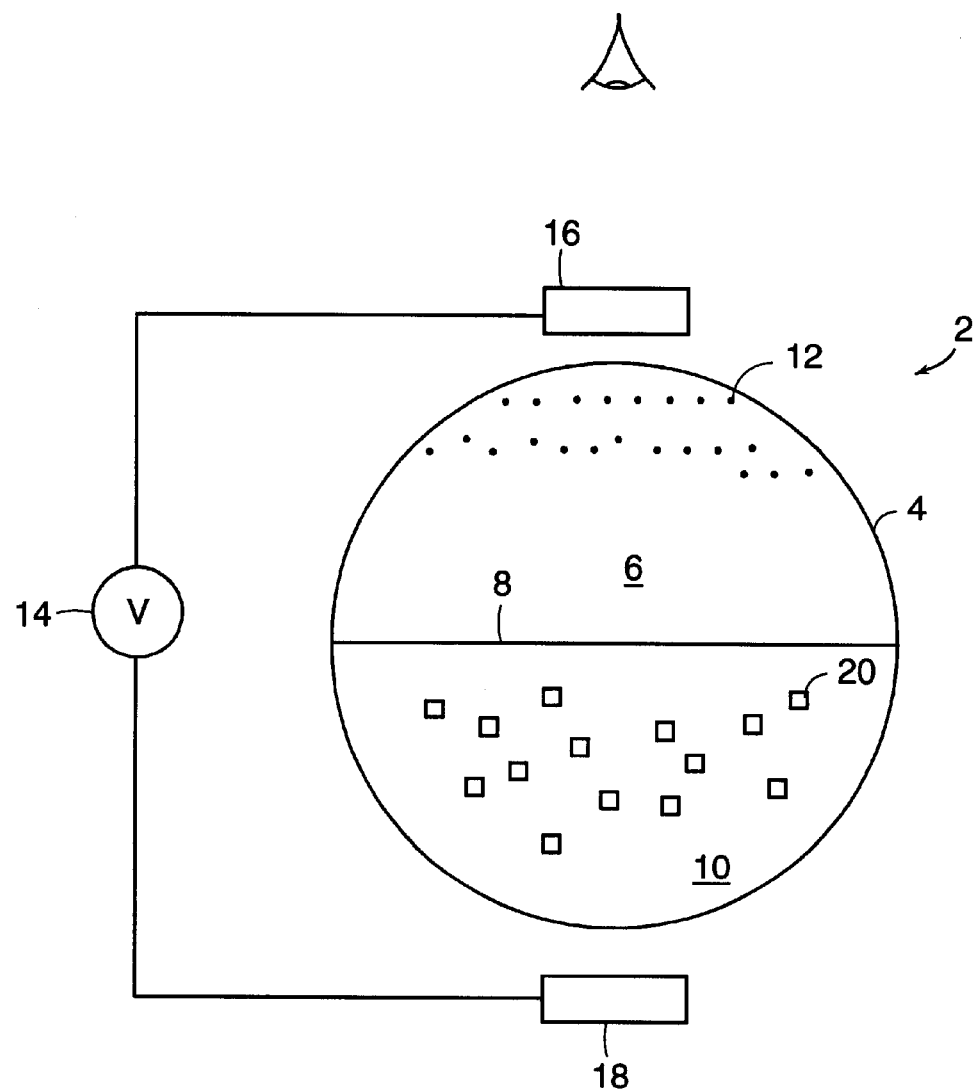
FIG. 6 is a schematic representation of a capsule of the invention addressed to a white state, the capsule containing two particle-containing subdroplets.
Figure 7:
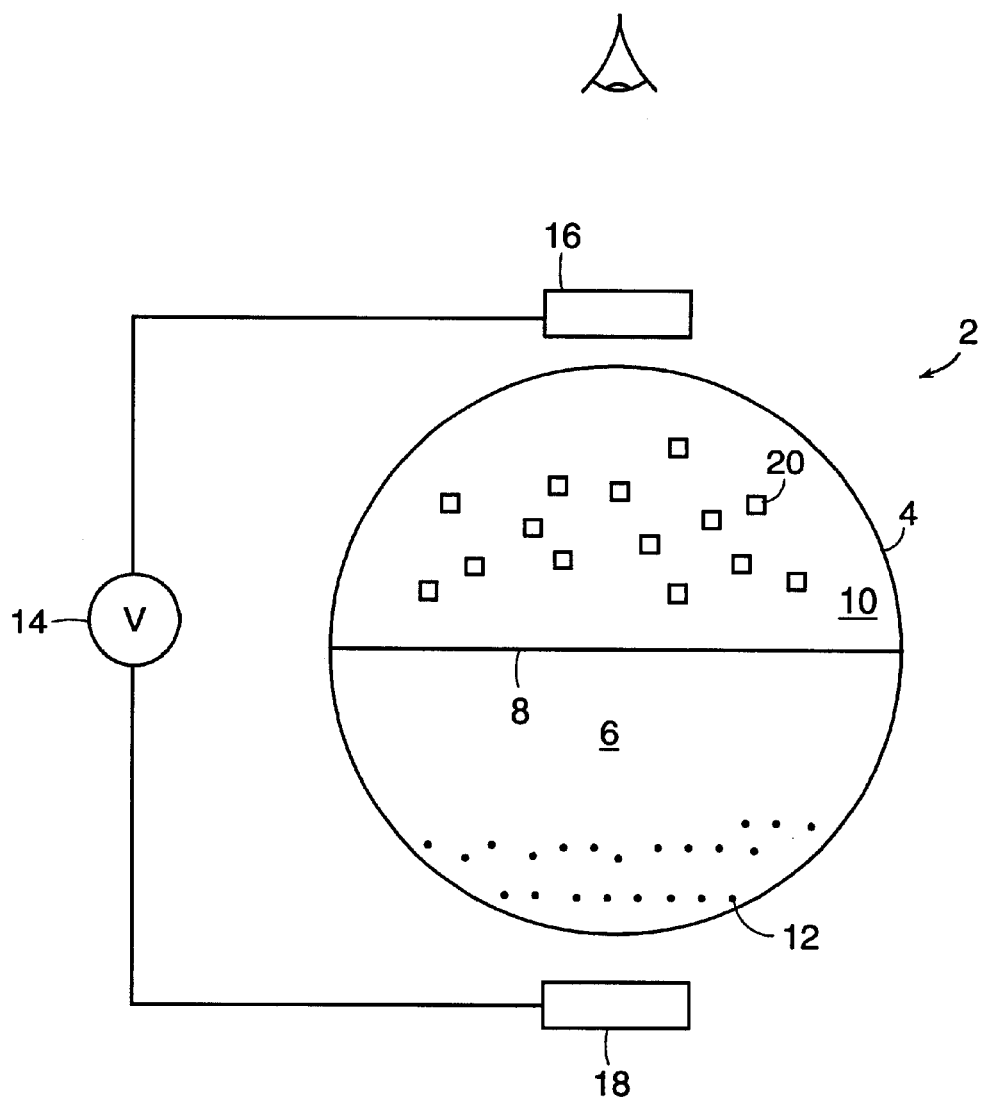
FIG. 7 is a schematic representation of a capsule of the invention addressed to a dark state, the capsule containing two particle-containing subdroplets.

Now referring to FIGS. 6 and 7, instead of the dyed fluid utilized in FIGS. 4 and 5, a capsule 2 contains a fluid 10 that itself contains a second plurality of particles 20. This fluid 10 can be either clear or dyed. A boundary 8 separates the fluid 10 containing the second particles 20 from the fluid 6 containing the first set of particles 12. In this situation, typically, both sets of particles 12, 20 have a surface treatment that substantially prevents the particles 12, 20 from crossing the boundary 8 and/or dispersing within the opposite fluid. These surface treatments, typically, are different. Thus, the first set of particles 12 does not substantially disperse in the fluid 10 in which the second particles 20 is dispersed, and the second set of particles 20 does not substantially disperse in the fluid 6 in which the first set of particles 12 is dispersed.

In the white state (FIG. 6), the first set of particles 12 is located at the front of the capsule 2, towards a viewer, while the second particles 20 are located towards the rear of the capsule 2 and hidden from the viewer. Again, without interference from a dye, the first set of particles 12 appear as an uncompromised white. When the electric field between two electrodes 16, 18 that is generated by the voltage generator 14 is reversed from the field that was used to produce (although not necessarily to maintain) the white state, a dark state is created (FIG. 7). This dark state results when the first set of particles 12 are hidden from view at the rear of the capsule 2 while the second particles 20 are at the front of the capsule 2 and visible to a viewer. The second particles 20 typically are colored particles. The capsule 2 takes on the appearance of the colored particles. Either one of or both of the first set of particles 12 and second particles 20 can be electrophoretically mobile and move in response to an electric field. Also, either one or both of the fluids 6, 10 in which the particles 12, 20 are suspended can move in response to an electric field.

Any two immiscible fluids can be chosen for the capsule interior. In Table 1, various classes of compounds that are suitable for use together, as well as particular examples of some of the classes, are shown. A non-exhaustive list of pairs of immiscible fluids is given in Table 1. Additionally, across each row of Table 1, particle surface treatments (i.e., polymers that can be associated with the surface of a particle) are coupled with these pairs of fluids. In particular, the specified surface treatment is used on particles suspended in "Fluid 1" (i.e., particles with surface treatments that are soluble in fluid 1 and are substantially insoluble in fluid 2). This table is not exhaustive and is meant to convey both particular examples and provide insight into the appropriate manner for determining couplings of fluids and surface treatments.

Although each row of this Table 1 conveys couplings for a system with a particle in only one of the fluids, the table may be extended to systems that have a particle in each of the fluids by choosing the appropriate immiscible phases and surface treatments. For example, the same pair of immiscible fluids is sometimes matched in two different rows of Table 1. In one row, a particular fluid is listed as "Fluid 1," while in the other row, the second fluid of the pair is listed as "Fluid 1." In that case, each fluid (i.e., fluid 1 in each row) has associated with it a suitable particle surface treatment. Thus, two different particle surface treatments can be chosen, one in each row, and each treatment corresponds with and is soluble in a different one of the immiscible fluids in the pair. Table 2 also shows some examples of fluid pairs. If a dyed fluid and a particle-containing fluid are used together, the dye must be substantially soluble in only one of the immiscible fluids, and the particles must be substantially readily dispersed only in the other fluid. If two particle-containing fluids are used, then at least some of the particles must be readily dispersed in only one fluid and not the other fluid, and vice versa.

TABLE 1

Pairs of immiscible fluids with surface treatments for particles in fluid 1.

| FLUID 1 | FLUID 2 | PARTICLE SURFACE TREATMENT |
|---|---|---|
| Ketones with 3–15 carbon atoms, such as acetone | Alkanes with more than 12 carbon atoms, such as hexadecane; Biphenyls and terphenyls, such as 4-pentyl,4'cyano biphenyl | acrylates and methacrylates, such as poly(ethylacrylate); Polyvinylchloride; Silicone polymers, such as poly(dimethylsiloxane); Poly(vinylpyridine) |
| Alcohols with 1 to 10 carbon atoms, such as ethanol | Alkanes with more than 12 carbon atoms, such as hexadecane; Biphenyls and terphenyls, such as 4-pentyl,4'cyano biphenyl | Silicon polymers, such as poly(dimethyl silane); Poly(vinylpyridine); Polyols, such as poly(vinylalcohol) |
| Biphenyls and terphenyls, such as 4-pentyl,4'cyano biphenyl | Alcohols and ketones, such as methanol and ethanol | Poly(alkylaryl)acrylates, such as poly(4-pentyl biphenyl acrylate); Aryl polyurethanes |
| Silicone oils, such as linear or cyclic poly(dimethyl siloxane) | Alkanes with more than 14 carbon atoms; Higher aromatic hydrocarbons | Silicone polymers, such as polydimethylsiloxanes and poly(phenyl methyl siloxane) |
| Higher perfluorocarbons, such as perfluorinated hexadecane; Perfluoro polyethers (Galden fluids) | Hydrocarbons, such as dodecane; Silicone oils, such as poly(dimethylsiloxane); Chlorinated hydrocarbons, such as chlorodecane; Aromatic hydrocarbons, such as toluene | Perfluoropolymers, such as poly(perfluoroisobutylene) or poly(perfluoroethylene) or perfluoro polyethers |
| Alkanes with more than 12 carbon atoms | Ketones, such as acetone; Silicone oils, such as poly(dimethylsiloxane); Perfluorocarbons such as perfluorodecane | Branched ester acrylates and methacrylates, such as poly(ethylhexyl acrylate) |
| Aromatic hydrocarbons with more than 14 carbon atoms | Silicone oils, such as poly(dimethylsiloxane); Higher perfluorocarbons, such as perfluorohexadecane | Polystyrene; Polyvinylpyridine; Polymers from esters of acrylates and/or methacrylates having more than 4 carbon atoms in the |

TABLE 1-continued

Pairs of immiscible fluids with surface treatments for particles in fluid 1.

| FLUID 1 | FLUID 2 | PARTICLE SURFACE TREATMENT |
|---|---|---|
| | | ester group, such as ethylhexyl acrylate; Polyurethanes; Poly(isobutylene); Poly(isoprene); Poly(butadiene) |

TABLE 2

Exemplary pairs of immiscible fluids.

| FLUID 1 | FLUID 2 |
|---|---|
| Ethanol | n-hexadecane |
| Acetone | n-hexadecane |
| Low molecular weight silicone polymers | Alkanes with more than 14 carbon atoms |
| Low molecular weight fluorinated polymers | Alkanes with more than 14 carbon atoms |
| Perfluorinated polyethers (Galden fluids) | Alkanes |
| Perfluoroalkanes with more than 6 carbon atoms | Hydrogenated alkanes with more than 6 carbon atoms |

For example, in a dyed fluid/particle-containing fluid capsule, if one fluid is a perfluoropoly(ether), such as poly(hexafluoro propylene oxide), a second fluid can be a hydrocarbon, such as n-dodecane. In this case, a particle with a perfluoropoly(ether) surface treatment is dispersible only in the perfluorinated oil, and the dye is chosen so that it is only soluble in the n-dodecane. Oil-soluble dyes such as Oil Blue N, Sudan Black B, Oil red O, and Oil red EGN can be used.

In this example, capsules are produced by first forming a dye/n-dodecane solution and then forming a particle/poly(hexafluoro propylene oxide) dispersion. These two fluids are then appropriately mixed, for example, by stirring, or, by spraying each fluid through one of two concentric nozzles (a process that is more fully described below), so as to form droplets. Substantially all of the resulting droplets contain the dyed fluid as a single subdroplet within the particle-containing poly(hexafluoro propylene oxide) subdroplet. These composite droplets are then encapsulated within a polymer shell using an encapsulation technique, some of which are described below, to form capsules. Such techniques include coacervation of polyelectrolytes (e.g., gelatin and gum arabic), interfacial polymerization, in situ polymerization, and liquid—liquid phase separation. For example, the droplets can be encapsulated by emulsion-based encapsulation similar to that described for FIG. 3A.

Typically, the fluids that are used within the capsule will bear on the appropriate encapsulation technique. Generally, encapsulation techniques that emulsify the droplets into polar emulsification solvents cannot be used if one of the immiscible fluids is polar enough to be soluble in the emulsification solvent. Similarly, the encapsulated droplet cannot be formed in a non-polar emulsification solvent if one of the immiscible fluids is sufficiently non-polar to be miscible with the emulsification solvent. While the immiscible pair of fluids will often contain one polar fluid and one non-polar fluid, other fluid pairs that are chemically incompatible (i.e., immiscible) for reasons other than polarity can be used in the present invention.

More particularly, a pair of immiscible fluids can be mixed into a droplet, before a separate encapsulation step, using two concentric nozzles that are in communication with a pump. One of the fluids is expelled through one of the nozzles, and the other fluid is expelled through the other nozzle. This droplet can then be encapsulated, assuming the fluids are chemically compatible with the encapsulation solvent, by, for example, gelatin/acacia encapsulation. In cases where encapsulation techniques and the fluids to be encapsulated are incompatible, for example, a physical coextrusion process can be used to encapsulate the droplet. In such a process, three concentric nozzles are attached to a pump. The droplets can be formed by pumping the dye-containing fluid solution through the inner nozzle, the particle dispersion-containing fluid through the middle nozzle, and an encapsulating polymer (as a solution or a melt) through the outer nozzle. As the fluids and polymer emerge from the nozzles, capsules are formed. Once the encapsulated droplets emerge from the nozzles, the capsules can be hardened by evaporating a solvent or solvents used during the pumping procedure or, if any of the materials are pumped through the nozzle at a temperature greater than the ambient temperature, by cooling the capsules.

During formation of unencapsulated droplets or encapsulated droplets according to the invention, several variables can be manipulated, depending upon, for example, the materials used. In the instance with two nozzles that form unencapsulated droplets, the dyed-fluid is pumped through the central nozzle and a second immiscible fluid containing dispersed particles is pumped through the outer nozzle, forming droplets. The droplets are extruded into the aqueous phase that has been prepared for encapsulation, described below. The droplets can be made one at a time using relatively low flow rates of the fluids through the nozzles, or the fluids can be co-extruded at relatively higher flow rates, for example, as a liquid jet that breaks up by Raleigh instability into individual droplets. In either case, droplet formation can be assisted by vibration of the concentric nozzles using, for example, a piezo-electric stack. In order to ensure the correct droplet morphology (two subdroplets forming a droplet), the spreading coefficients of the various liquids can be controlled. The spreading coefficient is a description of how one fluid spreads over another fluid.

The spreading coefficient can be mathematically modeled. Denoting the three liquids in the two-nozzle system as A, B, C where B is the encapsulation fluid (water), the three spreading coefficients for the three liquids are defined as:

$$S(A)=g(BC)-[g(AB)+g(AC)]$$
$$S(B)=g(AC)-[g(AB)+g(BC)]$$
$$S(C)=g(AB)-[g(AC)+g(BC)]$$

where g is the interfacial tension between two liquids. Assigning the liquids so that g(AB)>g(BC), droplets (containing a dye-fluid subdroplet and a particle-dispersed fluid subdroplet) can maintain a desired morphology when $$S(A)<0$$
$$S(B)<0$$
$$S(C)>0.$$

If the triple concentric nozzle encapsulation method is employed to produce microcapsules directly (no aqueous encapsulation step), then the same analysis determines the necessary interfacial tensions between the three liquids, except liquid B refers to the wall forming liquid extruded from the outermost nozzle. Liquid A and liquid B remain the two immiscible fluids from above. Generally, interfacial tensions in the three-nozzle system are set such that the encapsulating material preferentially wets the particle dispersion-containing fluid and/or such that the particle dispersion-containing fluid will preferentially wet the dye-containing fluid.

Other examples of variables that can be altered, depending upon the particular compounds employed in droplet formation and encapsulation, include pumping rate, flow rate, and viscosity. Typically, at least one of the pumping rates through one nozzle is different from another one of the pumping rates through a different nozzle. Also, the flow rate of materials through the nozzles, relative to each other, as well as the overall flux of material through the nozzles, can be varied. Also, the viscosity of the materials coming through the nozzles can affect the final morphology of the droplets.

The surface treatments of the particles can either provide, maintain, or increase the dispersibility of the particles in a particular fluid. Also, these surface treatments can provide, maintain, or increase the repulsive force between the particles to keep them dispersed. Various methods can be used to form the surface treatment on the particles. For example, a particle is reacted with a polymerization initiator, such as a peroxodisulfate or an azo-initiator, to generate a site on the particle surface that can generate a free radical. This free radical has an unpaired electron that reacts with particle surface treatment monomers in solution. After a monomer reacts with a free radical located on the particle surface, the product contains a free radical and adds another monomer by the same process, and so on. Another compound with an unpaired electron, such as oxygen or another growing polymer chain, can terminate the polymerization reaction. Branched polymers attached to the particle surface can be generated by using vinyl silanol monomers that have an unsaturated carbon—carbon bond that is reactive with a free radical. Polymer chains formed with these monomers are initiated by the free radical generated by the decomposition of a starting compound, such as 2,2'-azobis (isobutyronitrile), and monomers from solution are added one after the next, as described above. These polymers grow until they encounter a vinyl silanol monomer attached to a particle, with which they react. More monomers continue to add to the chain, but, because the monomer is attached to the particle, the chain grows out from this attached monomer, and a two branch polymer chain forms.

Ionic polymerization can be used instead of free-radical polymerization. In this case, a vinyl group is attached to the particle surface by reaction with an appropriate vinyl compound such as trichlorovinylsilane, and this moiety is converted to an ionic polymerization initiator by reaction with, for example, butyl lithium. Addition of a vinyl monomer, such as styrene, causes a polymerization to occur from the particle surface, generating (in this example) polystyrene chains on the particle surface. An acid, water, or a chain-capping agent, such as a halogenated hydrocarbon or a halogenated silicone, can terminate the polymerization reaction.

Additionally, degradation of the white state can be prevented by using a broad distribution of particle sizes, because the particles pack more closely together if they are different sizes. If dye is included in the fluid suspending the particles, more dye from the particle layer is excluded when the particles pack more closely together. Multi-sized particles can be used alone or in combination with the embodiments described above.

II. Materials for use in Electrophoretic Displays

Useful materials for constructing the above-described encapsulated electrophoretic displays are discussed below.

A. Particles

There is much flexibility in the choice of particles for use in electrophoretic displays, as described above. For purposes of this invention, a particle is any component that is charged or capable of acquiring a charge (i.e., has or is capable of acquiring electrophoretic mobility), and, in some cases, this mobility may be zero or close to zero (i.e., the particles will not move). The particles may be neat pigments, dyed (laked) pigments or pigment/polymer composites, or any other component that is charged or capable of acquiring a charge. Typical considerations for the electrophoretic particle are its optical properties, electrical properties, and surface chemistry. The particles may be organic or inorganic compounds, and they may either absorb light or scatter light. The particles for use in the invention may further include scattering pigments, absorbing pigments and luminescent particles. The particles may be retroreflective, such as corner cubes, or they may be electroluminescent, such as zinc sulfide particles, which emit light when excited by an AC field, or they may be photoluminescent. Finally, the particles may be surface treated so as to improve charging or interaction with a charging agent, or to improve dispersibility.

One particle for use in electrophoretic displays of the invention is titania. The titania particles may be coated with a metal oxide, such as aluminum oxide or silicon oxide, for example. The titania particles may have one, two, or more layers of metal-oxide coating. For example, a titania particle for use in electrophoretic displays of the invention may have a coating of aluminum oxide and a coating of silicon oxide. The coatings may be added to the particle in any order.

The electrophoretic particle is usually a pigment, a polymer, a laked pigment, or some combination of the above. A neat pigment can be any pigment, and, usually for a light colored particle, pigments such as, for example, rutile (titania), anatase (titania), barium sulfate, kaolin, or zinc oxide are useful. Some typical particles have high refractive indicies, high scattering coefficients, and low absorption coefficients. Other particles are absorptive, such as carbon black or colored pigments used in paints and inks. The pigment should also be insoluble in the suspending fluid. Yellow pigments such as diarylide yellow, hansa yellow, and benzidin yellow have also found use in similar displays. Any other reflective material can be employed for a light colored particle, including non-pigment materials, such as metallic particles.

Useful neat pigments include, but are not limited to, $PbCrO_4$, Cyan blue GT 55-3295 (American Cyanamid Company, Wayne, N.J.), Cibacron Black BG (Ciba Company, Inc., Newport, Del.), Cibacron Turquoise Blue G (Ciba), Cibalon Black BGL (Ciba), Orasol Black BRG (Ciba), Orasol Black RBL (Ciba), Acetarnine Blac, CBS (E. I. du Pont de Nemours and Company, Inc., Wilmington, Del.), Crocein Scarlet N Ex (du Pont) (27290), Fiber Black VF (duPont) (30235), Luxol Fast Black L (duPont) (Solv. Black 17), Nirosine Base No. 424 (duPont) (50415 B), Oil Black BG (duPont) (Solv. Black 16), Rotalin Black RM (duPont), Sevron Brilliant Red 3 B (duPont); Basic Black DSC (Dye Specialties, Inc.), Hectolene Black (Dye Specialties, Inc.), Azosol Brilliant Blue B (GAF, Dyestuff and Chemical Division, Wayne, N.J.) (Solv. Blue 9), Azosol Brilliant Green BA (GAF) (Solv. Green 2), Azosol Fast Brilliant Red B (GAF), Azosol Fast Orange RA Conc. (GAF) (Solv. Orange 20), Azosol Fast Yellow GRA Conc. (GAF) (13900 A), Basic Black KMPA (GAF), Benzofix Black CW-CF (GAF) (35435), Cellitazol BNFV Ex Soluble CF (GAF) (Disp. Black 9), Celliton Fast Blue AF Ex Conc (GAF) (Disp. Blue 9), Cyper Black IA (GAF) (Basic Blk. 3), Diamine Black CAP Ex Conc (GAF) (30235), Diamond Black EAN Hi Con. CF (GAF) (15710), Diamond Black PBBA Ex (GAF) (16505); Direct Deep Black EA Ex CF (GAF) (30235), Hansa Yellow G (GAF) (11680); Indanthrene Black BBK Powd. (GAF) (59850), Indocarbon CLGS Conc. CF (GAF) (53295), Katigen Deep Black NND Hi Conc. CF (GAF) (15711), Rapidogen Black 3 G (GAF) (Azoic Blk. 4); Sulphone Cyanine Black BA-CF (GAF) (26370), Zambezi Black VD Ex Conc. (GAF) (30015); Rubanox Red CP-1495 (The Sherwin-Williams Company, Cleveland, Ohio) (15630); Raven 11 (Columbian Carbon Company, Atlanta, Ga.), (carbon black aggregates with a particle size of about 25 $\mu$m), Statex B-12 (Columbian Carbon Co.) (a furnace black of 33 $\mu$m average particle size), and chrome green.

Particles may also include laked, or dyed, pigments. Laked pigments are particles that have a dye precipitated on them or which are stained. Lakes are metal salts of readily soluble anionic dyes. These are dyes of azo, triphenylmethane or anthraquinone structure containing one or more sulphonic or carboxylic acid groupings. They are usually precipitated by a calcium, barium or aluminium salt onto a substrate. Typical examples are peacock blue lake (CI Pigment Blue 24) and Persian orange (lake of CI Acid Orange 7), Black M Toner (GAF) (a mixture of carbon black and black dye precipitated on a lake).

A dark particle of the dyed type may be constructed from any light absorbing material, such as carbon black, or inorganic black materials. The dark material may also be selectively absorbing. For example, a dark green pigment may be used. Black particles may also be formed by staining latices with metal oxides, such latex copolymers consisting of any of butadiene, styrene, isoprene, methacrylic acid, methyl methacrylate, acrylonitrile, vinyl chloride, acrylic acid, sodium styrene sulfonate, vinyl acetate, chlorostyrene, dimethylaminopropylmethacrylamide, isocyanoethyl methacrylate and N-(isobutoxymethacrylamide), and optionally including conjugated diene compounds such as diacrylate, triacrylate, dimethylacrylate and trimethacrylate. Black particles may also be formed by a dispersion polymerization technique.

In the systems containing pigments and polymers, the pigments and polymers may form multiple domains within the electrophoretic particle, or be aggregates of smaller pigment/polymer combined particles. Alternatively, a central pigment core may be surrounded by a polymer shell. The pigment, polymer, or both can contain a dye. The optical purpose of the particle may be to scatter light, absorb light, or both. Useful sizes may range from 1 nm up to about 100 $\mu$m, as long as the particles are smaller than the bounding capsule. The density of the electrophoretic particle may be substantially matched to that of the suspending (i.e., electrophoretic) fluid. As defined herein, a suspending fluid has a density that is "substantially matched" to the density of the particle if the difference in their respective densities is between about zero and about two grams per milliliter ("g/ml"). This difference is preferably between about zero and about 0.5 g/ml.

Useful polymers for the particles include, but are not limited to: polystyrene, polyethylene, polypropylene, phenolic resins, Du Pont Elvax resins (ethylene-vinyl acetate copolymers), polyesters, polyacrylates, polymethacrylates, ethylene acrylic acid or methacrylic acid copolymers (Nucrel Resins—Dupont, Primacor Resins—Dow Chemical), acrylic copolymers and terpolymers (Elvacite Resins, DuPont) and PMMA. Useful materials for homopolymer/pigment phase separation in high shear melt include, but are not limited to, polyethylene, polypropylene, polymethylmethacrylate, polyisobutylmethacrylate, polystyrene, polybutadiene, polyisoprene, polyisobutylene, polylauryl methacrylate, polystearyl methacrylate, polyisobornyl methacrylate, poly-t-butyl methacrylate, polyethyl methacrylate, polymethyl acrylate, polyethyl acrylate, polyacrylonitrile, and copolymers of two or more of these materials. Some useful pigment/polymer complexes that are commercially available include, but are not limited to, Process Magenta PM 1776 (Magruder Color Company, Inc., Elizabeth, N.J.), Methyl Violet PMA VM6223 (Magruder Color Company, Inc., Elizabeth, N.J.), and Naphthol FGR RF6257 (Magruder Color Company, Inc., Elizabeth, N.J.).

The pigment-polymer composite may be formed by a physical process, (e.g., attrition or ball milling), a chemical process (e.g., microencapsulation or dispersion polymerization), or any other process known in the art of particle production. For example, the process and materials for both fabrication of liquid toner particles and the charging of those particles may be relevant.

New and useful electrophoretic particles may still be discovered, but a number of particles already known to those skilled in the art of electrophoretic displays and liquid toners can also prove useful. In general, the polymer requirements for liquid toners and encapsulated electrophoretic inks are similar, in that the pigment or dye must be easily incorporated therein, either by a physical, chemical, or physicochemical process, may aid in the colloidal stability, and may contain charging sites or may be able to incorporate materials which contain charging sites. One general requirement from the liquid toner industry that is not shared by encapsulated electrophoretic inks is that the toner must be capable of "fixing" the image, i.e., heat fusing together to create a uniform film after the deposition of the toner particles.

Typical manufacturing techniques for particles are drawn from the liquid toner and other arts and include ball milling, attrition, jet milling, etc. The process will be illustrated for the case of a pigmented polymeric particle. In such a case the pigment is compounded in the polymer, usually in some kind of high shear mechanism such as a screw extruder. The composite material is then (wet or dry) ground to a starting size of around 10 $\mu$m. It is then dispersed in a carrier liquid, for example ISOPAR® (Exxon, Houston, Tex.), optionally with some charge control agent(s), and milled under high shear for several hours down to a final particle size and/or size distribution.

Another manufacturing technique for particles drawn from the liquid toner field is to add the polymer, pigment, and suspending fluid to a media mill. The mill is started and simultaneously heated to temperature at which the polymer swells substantially with the solvent. This temperature is typically near 100° C. In this state, the pigment is easily encapsulated into the swollen polymer. After a suitable time, typically a few hours, the mill is gradually cooled back to ambient temperature while stirring. The milling may be continued for some time to achieve a small enough particle size, typically a few microns in diameter. The charging agents may be added at this time. Optionally, more suspending fluid may be added.

Chemical processes such as dispersion polymerization, mini- or micro-emulsion polymerization, suspension polymerization precipitation, phase separation, solvent evaporation, in situ polymerization, seeded emulsion polymerization, or any process which falls under the general category of microencapsulation may be used. A typical process of this type is a phase separation process wherein a dissolved polymeric material is precipitated out of solution onto a dispersed pigment surface through solvent dilution, evaporation, or a thermal change. Other processes include chemical means for staining polymeric latices, for example with metal oxides or dyes.

B. Suspending Fluid

The suspending fluid containing the particles can be chosen based on properties such as density, refractive index, and solubility. A preferred suspending fluid has a low dielectric constant (about 2), high volume resistivity (about $10^{15}$ ohm-cm), low viscosity (less than 5 centistokes ("cst")), low toxicity and environmental impact, low water solubility (less than 10 parts per million ("ppm")), high specific gravity (greater than 1.5), a high boiling point (greater than 90° C.), and a low refractive index (less than 1.2).

The choice of suspending fluid may be based on concerns of chemical inertness, density matching to the electrophoretic particle, or chemical compatibility with both the electrophoretic particle and bounding capsule. The viscosity of the fluid should be low, in some instances, for the particles to move. The refractive index of the suspending fluid may also be substantially matched to that of the particles. As used herein, the refractive index of a suspending fluid "is substantially matched" to that of a particle if the difference between their respective refractive indices is between about zero and about 0.3, and is preferably between about 0.05 and about 0.2.

Additionally, the fluid may be chosen to be a poor solvent for some polymers, which is advantageous for use in the fabrication of microparticles because it increases the range of polymeric materials useful in fabricating particles of polymers and pigments. Organic solvents, such as halogenated organic solvents, saturated linear or branched hydrocarbons, silicone oils, and low molecular weight halogen-containing polymers are some useful suspending fluids. The suspending fluid may comprise a single fluid. The fluid will, however, often be a blend of more than one fluid in order to tune its chemical and physical properties. Furthermore, the fluid may contain surface modifiers to modify the surface energy or charge of the electrophoretic particle or bounding capsule. Reactants or solvents for the microencapsulation process (oil soluble monomers, for example) can also be contained in the suspending fluid. Charge control agents can also be added to the suspending fluid.

Useful organic solvents include, but are not limited to, epoxides, such as, for example, decane epoxide and dodecane epoxide; vinyl ethers, such as, for example, cyclohexyl vinyl ether and Decave® (International Flavors & Fragrances, Inc., New York, N.Y.); and aromatic hydrocarbons, such as, for example, toluene and naphthalene. Useful halogenated organic solvents include, but are not limited to, tetrafluorodibromoethylene, tetrachloroethylene, trifluorochloroethylene, 1,2,4-trichlorobenzene, carbon tetrachloride. These materials have high densities. Useful hydrocarbons include, but are not limited to, dodecane, tetradecane, the aliphatic hydrocarbons in the Isopar® series (Exxon, Houston, Tex.), Norpar® (series of normal paraffinic liquids), Shell-Sol® (Shell, Houston, Tex.), and Sol-Trol® (Shell), naphtha, and other petroleum solvents. These materials usually have low densities. Useful examples of silicone oils include, but are not limited to, octamethyl cyclosiloxane and higher molecular weight cyclic siloxanes, poly (methyl phenyl siloxane), hexamethyldisiloxane, and polydimethylsiloxane. These materials usually have low densities. Useful low molecular weight halogen-containing polymers include, but are not limited to, poly(chlorotrifluoroethylene) polymer (Halogenated hydrocarbon Inc., River Edge, N.J.), Galden® (a perfluorinated ether from Ausimont, Morristown, N.J.), or Krytox® from Dupont (Wilmington, Del.). In a preferred embodiment, the suspending fluid is a poly (chlorotrifluoroethylene) polymer. In a particularly preferred embodiment, this polymer has a degree of polymerization from about 2 to about 10. Many of the above materials are available in a range of viscosities, densities, and boiling points.

The fluid must be capable of being formed into small droplets prior to a capsule being formed. Processes for forming small droplets include flow-through jets, membranes, nozzles, or orifices, as well as shear-based emulsifying schemes. The formation of small drops may be assisted by electrical or sonic fields. Surfactants and polymers can be used to aid in the stabilization and emulsification of the droplets in the case of an emulsion type encapsulation. One surfactant for use in displays of the invention is sodium dodecylsulfate.

It can be advantageous in some displays for the suspending fluid to contain an optically absorbing dye. This dye must be soluble in the fluid, but will generally be insoluble in the other components of the capsule. There is much flexibility in the choice of dye material. The dye can be a pure compound, or blends of dyes to achieve a particular color, including black. The dyes can be fluorescent, which would produce a display in which the fluorescence properties depend on the position of the particles. The dyes can be photoactive, changing to another color or becoming colorless upon irradiation with either visible or ultraviolet light, providing another means for obtaining an optical response. Dyes could also be polymerizable, forming a solid absorbing polymer inside the bounding shell.

There are many dyes that can be chosen for use in encapsulated electrophoretic display. Properties important here include light fastness, solubility in the suspending liquid, color, and cost. These are generally from the class of azo, anthraquinone, and triphenylmethane type dyes and may be chemically modified so as to increase the solubility in the oil phase and reduce the adsorption by the particle surface.

A number of dyes already known to those skilled in the art of electrophoretic displays will prove useful. Useful azo dyes include, but are not limited to: the Oil Red dyes, and the Sudan Red and Sudan Black series of dyes. Useful anthraquinone dyes include, but are not limited to: the Oil Blue dyes, and the Macrolex Blue series of dyes. Useful triphenylmethane dyes include, but are not limited to, Michler's hydrol, Malachite Green, Crystal Violet, and Auramine O.

C. Charge Control Agents and Particle Stabilizers

Charge control agents are used to provide good electrophoretic mobility to the electrophoretic particles. Stabilizers are used to prevent agglomeration of the electrophoretic particles, as well as prevent the electrophoretic particles from irreversibly depositing onto the capsule wall. Either component can be constructed from materials across a wide range of molecular weights (low molecular weight, oligomeric, or polymeric), and may be pure or a mixture. The charge control agent used to modify and/or stabilize the particle surface charge may be applied as generally known in the arts of liquid toners, electrophoretic displays, non-aqueous paint dispersions, and engine-oil additives. In all of these arts, charging species may be added to non-aqueous media in order to increase electrophoretic mobility or increase electrostatic stabilization. The materials can improve steric stabilization as well. Different theories of charging are postulated, including selective ion adsorption, proton transfer, and contact electrification.

An optional charge control agent or charge director may be used. These constituents typically consist of low molecular weight surfactants, polymeric agents, or blends of one or more components and serve to stabilize or otherwise modify the sign and/or magnitude of the charge on the electrophoretic particles. The charging properties of the pigment itself may be accounted for by taking into account the acidic or basic surface properties of the pigment, or the charging sites may take place on the carrier resin surface (if present), or a combination of the two. Additional pigment properties which may be relevant are the particle size distribution, the chemical composition, and the lightfastness. The charge control agent used to modify and/or stabilize the particle surface charge may be applied as generally known in the arts of liquid toners, electrophoretic displays, non-aqueous paint dispersions, and engine-oil additives. In all of these arts, charging species may be added to non-aqueous media in order to increase electrophoretic mobility or increase electrostatic stabilization. The materials can improve steric stabilization as well. Different theories of charging are postulated, including selective ion adsorption, proton transfer, and contact electrification.

Charge adjuvents may also be added. These materials increase the effectiveness of the charge control agents or charge directors. The charge adjuvent may be a polyhydroxy compound or an aminoalcohol compound, which are preferably soluble in the suspending fluid in an amount of at least 2% by weight. Examples of polyhydroxy compounds which contain at least two hydroxyl groups include, but are not limited to, ethylene glycol, 2,4,7,9-tetramethyl-decyn-4,7-diol, poly (propylene glycol), pentaethylene glycol, tripropylene glycol, triethylene glycol, glycerol, pentaerythritol, glycerol-tri-12 hydroxystearate, propylene glycerol monohydroxystearate, and ethylene glycol monohydroxystrearate. Examples of aminoalcohol compounds which contain at least one alcohol function and one amine function in the same molecule include, but are not limited to, triisopropanolamine, triethanolamine, ethanolamine, 3-amino-1 propanol, o-aminophenol, 5-amino-1-pentanol, and tetra(2-hydroxyehtyl)ethylenediamine. The charge adjuvent is preferably present in the suspending fluid in an amount of about 1 to about 100 milligrams per gram ("mg/g") of the particle mass, and more preferably about 50 to about 200 mg/g.

The surface of the particle may also be chemically modified to aid dispersion, to improve surface charge, and to improve the stability of the dispersion, for example. Surface modifiers include organic siloxanes, organohalogen silanes and other functional silane coupling agents (Dow Corning® Z-6070, Z-6124, and 3 additive, Midland, Mich.); organic titanates and zirconates (Tyzor® TOT, TBT, and TE Series, Dupont, Wilmington, Del.); hydrophobing agents, such as long chain (C12 to C50) alkyl and alkyl benzene sulphonic acids, fatty amines or diamines and their salts or quartemary derivatives; and amphipathic polymers which can be covalently bonded to the particle surface.

In general, it is believed that charging results as an acid-base reaction between some moiety present in the continuous phase and the particle surface. Thus useful materials are those which are capable of participating in such a reaction, or any other charging reaction as known in the art.

Different non-limiting classes of charge control agents which are useful include organic sulfates or sulfonates, metal soaps, block or comb copolymers, organic amides, organic zwitterions, and organic phosphates and phosphonates. Useful organic sulfates and sulfonates include, but are not limited to, bis(2-ethyl hexyl) sodium sulfosuccinate, calcium dodecyl benzene sulfonate, calcium petroleum sulfonate, neutral or basic barium dinonylnaphthalene sulfonate, neutral or basic calcium dinonylnaphthalene sulfonate, dodecylbenzenesulfonic acid sodium salt, and ammonium lauryl sulphate. Useful metal soaps include, but are not limited to, basic or neutral barium petronate, calcium petronate, Co—, Ca—, Cu—, Mn—, Ni—, Zn—, and Fe— salts of naphthenic acid, Ba—, Al—, Zn—, Cu—, Pb—, and Fe— salts of stearic acid, divalent and trivalent metal carboxylates, such as aluminum tristearate, aluminum octoate, lithium heptanoate, iron stearate, iron distearate, barium stearate, chromium stearate, magnesium octoate, calcium stearate, iron naphthenate, and zinc naphthenate, Mn— and Zn— heptanoate, and Ba—, Al—, Co—, Mn—, and Zn— Octoate. Useful block or comb copolymers include, but are not limited to, AB diblock copolymers of (A) polymers of 2-(N,N) dimethylaminoethyl methacrylate quaternized with methyl-p-toluenesulfonate and (B) poly-2-ethylhexyl methacrylate, and comb graft copolymers with oil soluble tails of poly (12-hydroxystearic acid) and having a molecular weight of about 1800, pendant on an oil-soluble anchor group of poly (methyl methacrylate-methacrylic acid). Useful organic amides include, but are not limited to, polyisobutylene succinimides such as OLOA 1200, and N-vinyl pyrrolidone polymers. Useful organic zwitterions include, but are not limited to, lecithin. Useful organic phosphates and phosphonates include, but are not limited to, the sodium salts of phosphated mono- and di-glycerides with saturated and unsaturated acid substituents.

Particle dispersion stabilizers may be added to prevent particle flocculation or attachment to the capsule walls. For the typical high resistivity liquids used as suspending fluids in electrophoretic displays, nonaqueous surfactants may be used. These include, but are not limited to, glycol ethers, acetylenic glycols, alkanolamides, sorbitol derivatives, alkyl amines, quaternary amines, imidazolines, dialkyl oxides, and sulfosuccinates.

D. Encapsulation

Encapsulation of the internal phase may be accomplished in a number of different ways. Numerous suitable procedures for microencapsulation are detailed in both *Microencapsulation, Processes and Applications,* (I. E. Vandegaer, ed.), Plenum Press, New York, N.Y. (1974) and Gutcho, *Microcapsules and Mircroencapsulation Techniques,* Nuyes Data Corp., Park Ridge, N.J. (1976). The processes fall into several general categories, all of which can be applied to the present invention: interfacial polymerization, in situ polymerization, physical processes, such as coextrusion and other phase separation processes, in-liquid curing, and simple/complex coacervation.

Numerous materials and processes should prove useful in formulating displays of the present invention. Useful materials for simple coacervation processes include, but are not limited to, gelatin, polyvinyl alcohol, polyvinyl acetate, and cellulosic derivatives, such as, for example, carboxymethylcellulose. Useful materials for complex coacervation processes include, but are not limited to, gelatin, acacia, carageenan, carboxymethylcellulose, hydrolized styrene anhydride copolymers, agar, alginate, casein, albumin, methyl vinyl ether co-maleic anhydride, and cellulose phthalate. Useful materials for phase separation processes include, but are not limited to, polystyrene, PMMA, polyethyl methacrylate, polybutyl methacrylate, ethyl cellulose, polyvinyl pyridine, and poly acrylonitrile. Useful materials for in situ polymerization processes include, but are not limited to, polyhydroxyamides, with aldehydes, melamine, or urea and formaldehyde; water-soluble oligomers of the condensate of melamine, or urea and formaldehyde; and vinyl monomers, such as, for example, styrene, MMA and acrylonitrile. Finally, useful materials for interfacial polymerization processes include, but are not limited to, diacyl chlorides, such as, for example, sebacoyl, adipoyl, and di- or poly-amines or alcohols, and isocyanates. Useful emulsion polymerization materials may include, but are not limited to, styrene, vinyl acetate, acrylic acid, butyl acrylate, t-butyl acrylate, methyl methacrylate, and butyl methacrylate.

Capsules produced may be dispersed into a curable carrier, resulting in an ink which may be printed or coated on large and arbitrarily shaped or curved surfaces using conventional printing and coating techniques.

In the context of the present invention, one skilled in the art will select an encapsulation procedure and wall material based on the desired capsule properties. These properties include the distribution of capsule radii; electrical, mechanical, diffusion, and optical properties of the capsule wall; and chemical compatibility with the internal phase of the capsule.

The capsule wall generally has a high electrical resistivity. Although it is possible to use walls with relatively low resistivities, this may limit performance in requiring relatively higher addressing voltages. The capsule wall should also be mechanically strong (although if the finished capsule powder is to be dispersed in a curable polymeric binder for coating, mechanical strength is not as critical). The capsule wall should generally not be porous. If, however, it is desired to use an encapsulation procedure that produces porous capsules, these can be overcoated in a post-processing step (i.e., a second encapsulation). Moreover, if the capsules are to be dispersed in a curable binder, the binder will serve to close the pores. The capsule walls should be optically clear. The wall material may, however, be chosen to match the refractive index of the internal phase of the capsule (i.e., the suspending fluid) or a binder in which the capsules are to be dispersed. For some applications (e.g., interposition between two fixed electrodes), monodispersed capsule radii are desirable.

An encapsulation technique that is suited to the present invention involves a polymerization between urea and formaldehyde in an aqueous phase of an oil/water emulsion in the presence of a negatively charged, carboxyl-substituted, linear hydrocarbon polyelectrolyte material. The resulting capsule wall is a urea/formaldehyde copolymer, which discretely encloses the internal phase. The capsule is clear, mechanically strong, and has good resistivity properties.

The related technique of in situ polymerization utilizes an oil/water emulsion, which is formed by dispersing the electrophoretic composition (i.e., the dielectric liquid containing a suspension of the pigment particles) in an aqueous environment. The monomers polymerize to form a polymer with higher affinity for the internal phase than for the aqueous phase, thus condensing around the emulsified oily droplets. In one useful in situ polymerization processes, urea and formaldehyde condense in the presence of poly(acrylic acid) (See, e.g., U.S. Pat. No. 4,001,140). In other useful process, described in U.S. Pat. No. 4,273,672, any of a variety of cross-linking agents borne in aqueous solution is deposited around microscopic oil droplets. Such cross-linking agents include aldehydes, especially formaldehyde, glyoxal, or glutaraldehyde; alum; zirconium salts; and poly isocyanates.

The coacervation approach also utilizes an oil/water emulsion. One or more colloids are coacervated (i.e., agglomerated) out of the aqueous phase and deposited as shells around the oily droplets through control of temperature, pH and/or relative concentrations, thereby creating the microcapsule. Materials suitable for coacervation include gelatins and gum arabic. See, e.g., U.S. Pat. No. 2,800,457.

The interfacial polymerization approach relies on the presence of an oil-soluble monomer in the electrophoretic composition, which once again is present as an emulsion in an aqueous phase. The monomers in the minute hydrophobic droplets react with a monomer introduced into the aqueous phase, polymerizing at the interface between the droplets and the surrounding aqueous medium and forming shells around the droplets. Although the resulting walls are relatively thin and may be permeable, this process does not require the elevated temperatures characteristic of some other processes, and therefore affords greater flexibility in terms of choosing the dielectric liquid.

Figure 3A:
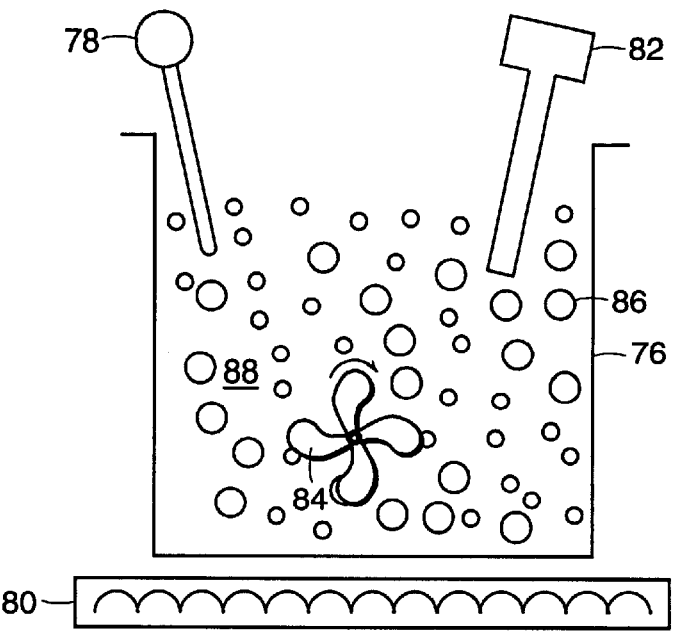
FIG. 3A is a schematic illustration of an apparatus for performing emulsion-based encapsulation.

FIG. 3A illustrates an exemplary apparatus and environment for performing emulsion-based encapsulation. An oil/water emulsion, is prepared in a vessel 76 equipped with a device 78 for monitoring and a device 80 for controlling the temperature. A pH monitor 82 may also be included. An impeller 84 maintains agitation throughout the encapsulation process, and in combination with emulsifiers, can be used to control the size of the emulsion droplets 86 that will lead to the finished capsules. The aqueous continuous phase 88 may contain, for example, a prepolymer and various system modifiers.

Figure 3B:
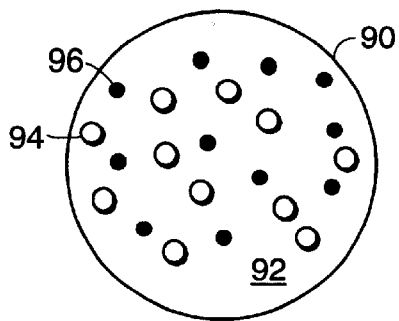
FIG. 3B is a schematic illustration of an oil drop of suspending fluid having white and black particles dispersed within it.

FIG. 3B illustrates an oil drop 90 comprising a substantially transparent suspending fluid 92, in which is dispersed white microparticles 94 and black particles 96. Preferably, particles 94 and 96 have densities substantially matched to the density of suspending fluid 92. The liquid phase may also contain some threshold/bistability modifiers, charge control agents, and/or hydrophobic monomers to effect an interfacial polymerization.

Figure 3C:
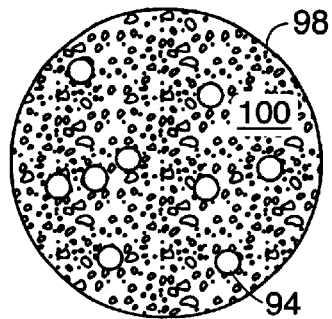
FIG. 3C is a schematic illustration of an oil drop of darkly dyed suspending fluid having white microparticles and charge control agents dispersed within it.

FIG. 3C illustrates a similar oil drop 98 comprising a darkly dyed suspending fluid 100 containing a dispersion of white particles 94 and appropriate charge control agents.

Coating aids can be used to improve the uniformity and quality of the coated or printed electrophoretic ink material. Wetting agents are typically added to adjust the interfacial tension at the coating/substrate interface and to adjust the liquid/air surface tension. Wetting agents include, but are not limited to, anionic and cationic surfactants, and nonionic species, such as silicone or fluoropolymer based materials. Dispersing agents may be used to modify the interfacial tension between the capsules and binder, providing control over flocculation and particle settling.

Surface tension modifiers can be added to adjust the air/ink interfacial tension. Polysiloxanes are typically used in such an application to improve surface levelling while minimizing other defects within the coating. Surface tension modifiers include, but are not limited to, fluorinated surfactants, such as, for example, the Zonyl® series from DuPont (Wilmington, Del.), the Fluorod® series from 3M (St. Paul, Minn.), and the fluoroakyl series from Autochem (Glen Rock, N.J.); siloxanes, such as, for example, Silwet® from Union Carbide (Danbury, Conn.); and polyethoxy and polypropoxy alcohols. Antifoams, such as silicone and silicone-free polymeric materials, may be added to enhance the movement of air from within the ink to the surface and to facilitate the rupture of bubbles at the coating surface. Other useful antifoams include, but are not limited to, glyceryl esters, polyhydric alcohols, compounded antifoams, such as oil solutions of alkyl benzenes, natural fats, fatty acids, and metallic soaps, and silicone antifoaming agents made from the combination of dimethyl siloxane polymers and silica. Stabilizers such as uv-absorbers and antioxidants may also be added to improve the lifetime of the ink.

Other additives to control properties like coating viscosity and foaming can also be used in the coating fluid. Stabilizers (uv-absorbers, antioxidants) and other additives which could prove useful in practical materials.

E. Binder Material

The binder typically is used as an adhesive medium that supports and protects the capsules, as well as, binds the electrode materials to the capsule dispersion. The binder can be non-conducting, semiconductive, or conductive. Binders are available in many forms and chemical types. Among these are water-soluble polymers, water-borne polymers, oil-soluble polymers, thermoset and thermoplastic polymers, and radiation-cured polymers.

Among the water-soluble polymers are the various polysaccharides, the polyvinyl alcohols, N-methyl Pyrollidone, N-vinyl pyrollidone, the various Carbowax species (Union Carbide, Danbury, Conn.), and poly-2-hydroxyethylacrylate.

The water-dispersed or water-borne systems are generally latex compositions, typified by the Neorez® and Neocryl® resins (Zeneca Resins, Wilmington, Mass.), Acrysol®

(Rohm and Haas, Philadelphia, Pa.), Bayhydrol® (Bayer, Pittsburgh, Pa.), and the Cytec Industries (West Paterson, N.J.) HP line. These are generally latices of polyurethanes, occasionally compounded with one or more of the acrylics, polyesters, polycarbonates or silicones, each lending the final cured resin in a specific set of properties defined by glass transition temperature, degree of "tack," softness, clarity, flexibility, water permeability and solvent resistance, elongation modulus and tensile strength, thermoplastic flow, and solids level. Some water-borne systems can be mixed with reactive monomers and catalyzed to form more complex resins. Some can be further cross-linked by the use of a crosslinking reagent, such as an aziridine, for example, which reacts with carboxyl groups.

A typical application of a water-borne resin and aqueous capsules follows. A volume of particles is centrifuged at low speed to separate excess water. After a given centrifugation process, for example 10 minutes at 60×gravity ("G"), the capsules are found at the bottom of the centrifuge tube, while the water portion is at the top. The water portion is carefully removed (by decanting or pipetting). The mass of the remaining capsules is measured, and a mass of resin is added such that the mass of resin is between one eighth and one tenth of the weight of the capsules. This mixture is gently mixed on an oscillating mixer for approximately one half hour. After about one half hour, the mixture is ready to be coated onto the appropriate substrate.

The thermoset systems are exemplified by the family of epoxies. These binary systems can vary greatly in viscosity, and the reactivity of the pair determines the "pot life" of the mixture. If the pot life is long enough to allow a coating operation, capsules may be coated in an ordered arrangement in a coating process prior to the resin curing and hardening.

Thermoplastic polymers, which are often polyesters, are molten at high temperatures. A typical application of this type of product is hot-melt glue. A dispersion of heat-resistant capsules could be coated in such a medium. The solidification process begins during cooling, and the final hardness, clarity and flexibility are affected by the branching and molecular weight of the polymer.

Oil or solvent-soluble polymers are often similar in composition to the water-borne system, with the obvious exception of the water itself. The latitude in formulation for solvent systems is enormous, limited only by solvent choices and polymer solubility. Of considerable concern in solvent-based systems is the viability of the capsule itself—the integrity of the capsule wall cannot be compromised in any way by the solvent.

Radiation cure resins are generally found among the solvent-based systems. Capsules may be dispersed in such a medium and coated, and the resin may then be cured by a timed exposure to a threshold level of ultraviolet radiation, either long or short wavelength. As in all cases of curing polymer resins, final properties are determined by the branching and molecular weights of the monomers, oligomers and crosslinkers.

A number of "water-reducible" monomers and oligomers are, however, marketed. In the strictest sense, they are not water soluble, but water is an acceptable diluent at low concentrations and can be dispersed relatively easily in the mixture. Under these circumstances, water is used to reduce the viscosity (initially from thousands to hundreds of thousands centipoise). Water-based capsules, such as those made from a protein or polysaccharide material, for example, could be dispersed in such a medium and coated, provided the viscosity could be sufficiently lowered. Curing in such systems is generally by ultraviolet radiation.

III. EXAMPLES

Example 1

The following procedure describes gelatin/acacia microencapsulation for use in electrophoretic displays of the present invention.

A. Preparation of Internal Phase

Two immiscible fluids, are appropriately mixed, for example, by stirring or by extrusion through two concentric nozzles, so as to form droplets, as described above. One or more of the fluids can be a dispersion containing a particle. A particle can have an appropriate surface treatment, as described above.

B. Preparation of Aqueous Phase 10.0 g of acacia (Aldrich) is dissolved in 100.0 g of water with stirring at room temperature for 30 minutes. The resulting mixture is decanted into two 50 mL polypropylene centrifuge tubes and centrifuged at about 2000 rpm for 10 minutes to remove insoluble material. 66 g of the purified solution is then decanted into a 500 mL non-baffled jacketed reactor, and the solution is then heated to 40° C. A six-blade (vertical geometry) paddle agitator is then placed just beneath the surface of the liquid. While agitating the solution at 200 rpm, 6 g of gelatin (300 bloom, type A, Aldrich) is carefully added over about 20 seconds in order to avoid lumps. Agitation is then reduced to 50 rpm to reduce foaming. The resulting solution is then stirred for 30 minutes.

C. Encapsulation

With agitation at 200 rpm, the mixed immiscible fluids (in this case these are typically non-polar fluids), prepared as described above, is introduced into the aqueous phase, also prepared as described above. The resulting fluid/water emulsion is allowed to emulsify for 20 minutes. To this emulsion is slowly added over about 20 seconds 200 g of water that has been preheated to 40° C. The pH is then reduced to 4.4 over five minutes with a 10% acetic acid solution (acetic acid from Aldrich). The pH is monitored using a pH meter that was previously calibrated with pH 7.0 and pH 4.0 buffer solutions. Stir for 40 minutes. 150 g of water that has been preheated to 40° C. is then added, and the contents of the reactor are then cooled to 10° C. When the solution temperature reaches 10° C., 3.0 mL of a 37% formalin solution (Aldrich) is added, and the solution is further stirred for another 60 minutes. 20 g of sodium carboxymethylcellulose (NaCMC) is added, and the pH is then raised to 10.0 by the addition of a. 20 wt % solution of sodium hydroxide (NaOH). The thermostat bath is then set to 40° C. and allowed to stir for another 70 minutes. The slurry is allowed to cool to room temperature overnight with stirring. The resulting capsule slurry is then ready to be sieved.

D. Formation of Display

Two procedures for preparing an electrophoretic display from the above described capsule slurry are described below.

1. Procedure using a Urethane Binder

The resulting capsule slurry from above is mixed with the aqueous urethane binder NeoRez R-9320 (Zeneca Resins, Wilmington, Mass.) at a ratio of one part binder to 10 parts capsules. The resulting mixture is then coated using a doctor blade onto about a 100 μm to about 125 μm thick sheet of indium-tin oxide sputtered polyester film. The blade gap of the doctor blade is controlled to about 0.18 mm so as to lay down a single layer of capsules. The coated film is then dried in hot air (60° C.) for 30 minutes. After drying, the dried film is hot laminated at 60° C. to a backplane comprising about a 100 μm to about 125 μm thick sheet of polyester screen printed with thick film silver and dielectric inks with a pressure of 15 psi in a hot roll laminate from Cheminstruments, Fairfield, Ohio. The backplane is connected to the film using an anisotropic tape. The conductive areas form addressable areas of the resulting display.

2. Procedure using a Urethane/Polyvinyl Alcohol Binder

The resulting capsule slurry from above is mixed with the aqueous binder comprising a mixture of NeoRez R-966 (Zeneca Resins) and a 20% solution of Airvol 203 (a polyvinyl alcohol, Airvol Industries, Allentown, Pa.) at a ratio of one part Airvol 203 solution to one part NeoRez R-966 to five parts capsules. The resulting mixture is then coated using a doctor blade onto about a 100 μm to about 125 μm thick sheet of indium-tin oxide sputtered polyester film. The blade gap of the doctor blade is controlled to 0.18 mm so as to lay down an single layer of capsules. The coated film is then dried in hot air (60° C.) for 30 minutes. After drying, a thick film silver ink is then printed directly onto the back of the dried film and allowed to cure at 60° C. The conductive areas form the addressable areas of the display.

Example 2

The following is an example of the preparation of microcapsules by in situ polymerization.

In a 500 mL non-baffled jacketed reactor is mixed 50 mL of a 10 wt % aqueous solution of ethylene co-maleic anhydride (Aldrich), 100 mL water, 0.5 g resorcinol (Aldrich), and 5.0 g urea (Aldrich). The mixture is stirred at 200 rpm and the pH adjusted to 3.5 with a 25 wt % NaOH solution over a period of 1 minute. The pH is monitored using a pH meter that was previously calibrated with pH 7.0 and pH 4.0 buffer solutions. To this is slowly added the immiscible fluids, prepared as described above in Ex. 1, and agitation is increased to 450 rpm to reduce the average particle size to less than 200 μm. 12.5 g of a 37 wt % aqueous formaldehyde solution is then added and the temperature raised to 55° C. The solution is heated at 55° C. for two hours.

Example 3

The following is an example of the preparation of microcapsules by interfacial polymerization.

To 44 g of the immiscible fluids, prepared as described above in Ex. 1, is added 1.0 g of sebacoyl chloride (Aldrich). Three milliliters of the mixture is then dispersed in 200 mL of water with stirring at 300 rpm at room temperature. To this dispersion is then added 2.5 mL of a 10 wt. % aqueous solution of 1,6-diaminohexane. Capsules form after about one hour.

Encapsulated electrophoretic displays and materials useful in constructing them are therefore described. Additional aspects and advantages of the invention are apparent upon consideration of the foregoing. Accordingly, the scope of the invention is limited only by the scope of the appended claims.

What is claimed is:

1. An encapsulated electrophoretic display element comprising a capsule containing at least two substantially immiscible fluids, wherein a first fluid includes an additive and a second fluid includes a plurality of particles.

2. The display element of claim 1 wherein at least a portion of the particles of the second fluid is not substantially dispersible in the first fluid.

3. The display element of claim 1 wherein at least a portion of the plurality of particles has a surface treatment.

4. The display element of claim 1 wherein the additive comprises a dye.

5. The display element of claim 4 wherein the dye is substantially insoluble in the second fluid.

6. The display element of claim 4 wherein the dye is soluble in the first fluid.

7. The display element of claim 1 wherein the additive comprises a second plurality of particles.

8. The display element of claim 7 wherein at least a portion of the second particles is not substantially dispersible in the second fluid.

9. The display element of claim 7 wherein at least a portion of the second particles has a surface treatment.

10. The display element of claim 7 wherein the second particles are capable of moving under an electric field.

11. The display element of claim 7 wherein the second fluid is capable of being displaced by the second particles.

12. The display element of claim 1 wherein the first fluid comprises a polar substance and the second fluid comprises a non-polar substance.

13. The display element of claim 1 wherein the first fluid comprises a non-polar substance and the second fluid comprises a polar substance.

14. The display element of claim 1 wherein the particles of the second fluid are capable of moving under an electric field.

15. The display element of claim 1 wherein the first fluid is capable of being displaced by the particles of the second fluid.

16. The display element of claim 1 wherein the particles of the second fluid comprise at least two different species of particles, the species of particles differing in their size.

17. The display element of claim 1 wherein the particles of the second fluid comprise at least two different species of particles, the species of particles differing in their shape.

18. A process for creating an encapsulated electrophoretic display, comprising the steps of:
   (a) forming a first mixture comprising an additive in a first fluid;
   (b) forming a second mixture comprising a plurality of particles in a second fluid;
   (c) combining the first mixture and the second mixture into a droplet, wherein the first mixture and the second mixture are substantially immiscible; and
   (d) forming a capsule around the droplet.

19. The process of claim 18 wherein the additive comprises a dye.

20. The process of claim 18 wherein the additive comprises a second plurality of particles.

21. An encapsulated electrophoretic display comprising at least one display element, each display element comprising a capsule containing at least two substantially immiscible fluids, wherein a first fluid includes an additive and a second fluid includes a plurality of particles.

22. The display of claim 21 further comprising at least one electrode adjacent the display element.

23. The display of claim 21 wherein the additive comprises a dye.

24. The display of claim 21 wherein the additive comprises a second plurality of particles.

* * * * *